United States Patent [19]
Kawai et al.

[11] Patent Number: 6,025,797
[45] Date of Patent: Feb. 15, 2000

[54] ANGULAR SHIFT DETERMINING APPARATUS FOR DETERMINING ANGULAR SHIFT OF CENTRAL AXIS OF RADAR USED IN AUTOMOTIVE OBSTACLE DETECTION SYSTEM

[75] Inventors: Nobuharu Kawai, Okazaki; Noriaki Shirai, Kariya, both of Japan

[73] Assignee: Denso Corporation, Kariya, Japan

[21] Appl. No.: 09/120,232

[22] Filed: Jul. 22, 1998

[30] Foreign Application Priority Data

Jul. 22, 1997 [JP] Japan ..................................... 9-195916

[51] Int. Cl.7 .................................................... G01S 13/93
[52] U.S. Cl. ................................ 342/70; 342/27; 342/61; 342/71; 342/72; 342/175; 342/195; 701/70; 701/300; 701/301
[58] Field of Search .................................. 701/301, 1, 36, 701/45, 70, 300; 342/27, 28, 29, 41, 61, 70, 71, 72, 175, 192, 193, 194, 195, 196, 197

[56] References Cited

U.S. PATENT DOCUMENTS

| | | | |
|---|---|---|---|
| 5,479,173 | 12/1995 | Yoshioka et al. ........................ | 342/70 |
| 5,485,155 | 1/1996 | Hibino . | |
| 5,574,463 | 11/1996 | Shirai et al. . | |
| 5,627,511 | 5/1997 | Takagi et al. . | |
| 5,631,639 | 5/1997 | Hibino et al. . | |
| 5,670,963 | 9/1997 | Kubota et al. . | |
| 5,684,473 | 11/1997 | Hibino et al. . | |
| 5,710,565 | 1/1998 | Shirai et al. . | |
| 5,745,870 | 4/1998 | Yamamoto et al. ..................... | 701/301 |
| 5,754,099 | 5/1998 | Nishimura et al. ................... | 342/70 X |
| 5,798,727 | 8/1998 | Shirai et al. ............................ | 342/70 |

FOREIGN PATENT DOCUMENTS

| | | |
|---|---|---|
| 7-120555 | 5/1995 | Japan . |
| 8-320371 | 12/1996 | Japan . |
| 9-236659 | 9/1997 | Japan . |

*Primary Examiner*—Bernarr E. Gregory
*Attorney, Agent, or Firm*—Pillsbury Madison & Sutro LLP

[57] ABSTRACT

An angular shift determining apparatus is provided which may be employed in an automotive obstacle detection system designed to determine a distance to and angular direction of a target tracked by a radar. The angular shift determining apparatus determines an angular shift of the central axis of radiation of radar waves from the longitudinal center line of a vehicle equipped with the obstacle detection system based on a relative position of the target and removes from the determined angular shift an error component produced when a preceding vehicle traveling with a lateral offset from the system vehicle is tracked as the target and an error component produced when a stationary object located on a curved road is tracked by the radar as the target to mathematically project an actual angular shift of the central axis of radiation of radar waves.

27 Claims, 14 Drawing Sheets

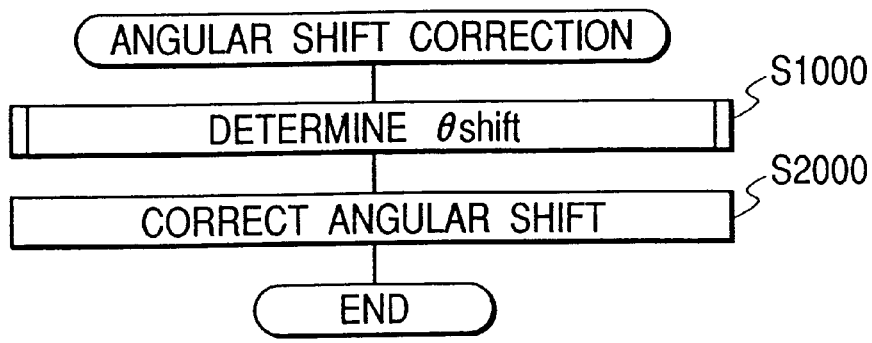
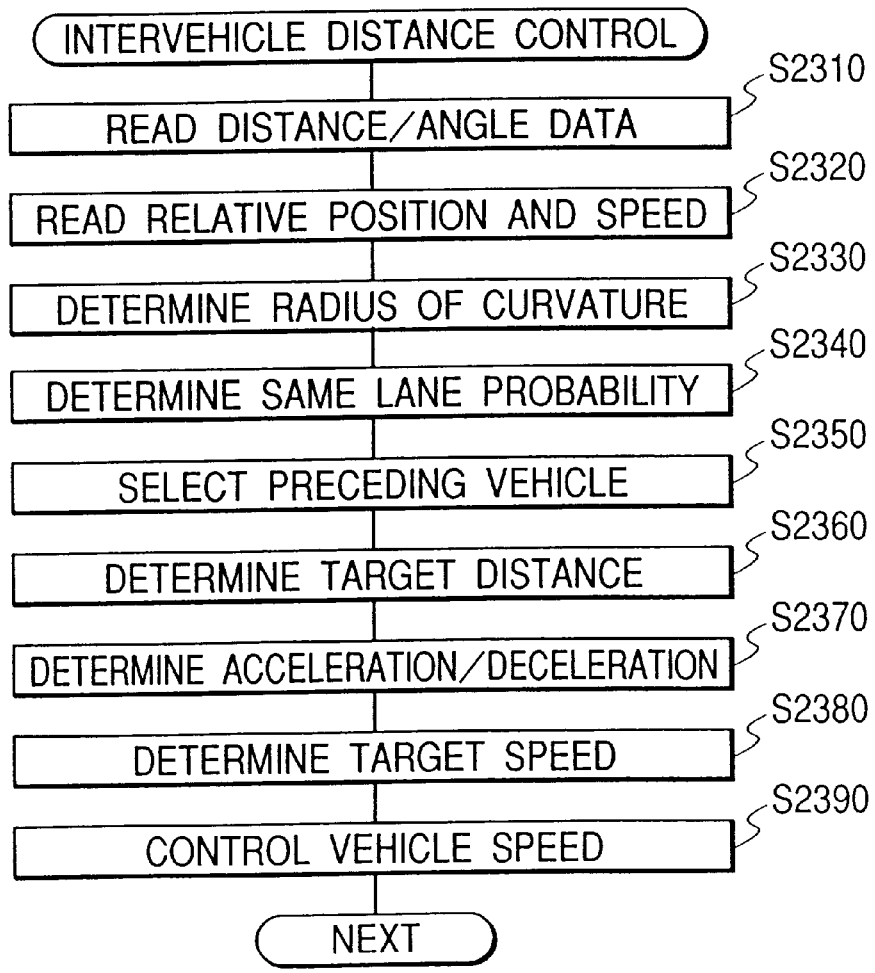

$X_0$ : CONSTANT $\theta$ : CONSTANT

6,025,797

ANGULAR SHIFT DETERMINING APPARATUS FOR DETERMINING ANGULAR SHIFT OF CENTRAL AXIS OF RADAR USED IN AUTOMOTIVE OBSTACLE DETECTION SYSTEM

BACKGROUND OF THE INVENTION

1. Technical Field of the Invention

The present invention relates generally to an angular shift determining apparatus designed to determine an angular shift of a central axis of radiation of radar waves from an obstacle detection system installed in an automotive vehicle for determining the position of a target accurately.

2. Background of Related Art

Automotive obstacle recognition systems are known in the art which are designed to transmit radar waves such as light waves or electromagnetic waves and receive a signal reflected from a detectable zone to determine the distance to and angular direction or azimuth of an object present ahead of the vehicle. Such systems are employed in cruise control which keeps an intervehicle distance constant and/or collision alarm control which measures the distance to an obstacle such as a preceding vehicle and issues an alarm when the measured distance falls in a warning range.

The physical installation of the above automotive obstacle detection systems in vehicles requires precise alignment of a central axis of radiation of radar waves with a longitudinal center line of the vehicle. The misalignment therebetween will result in an error in determining an angular direction of an obstacle tracked by the system, which may cause vehicles traveling on an adjacent traffic lane to be recognized as traveling on the same traffic lane as a system-equipped vehicle, and vice versa. The exact alignment of the central axis of radar wave radiation with the longitudinal center line of the vehicle requires fine adjustment in physical installation of the automotive obstacle detection system, which undesirably consumes the time of the operator.

FIG. 15(a) illustrates for the case where a preceding vehicle 93 is traveling along the longitudinal center line of a system-equipped vehicle 91 (hereinafter, referred to as a system vehicle) at a constant intervehicle distance. If the central axis of radar wave radiation from the system vehicle 91 is shifted, as indicated by numeral 95, from the longitudinal center line of the system vehicle, it will cause the preceding vehicle 93 to be detected in error at a location θm away from the longitudinal center line of the system vehicle.

The angular shift of the central axis of radar wave radiation may be determined by a relative position of an object such as the preceding vehicle 93 existing just ahead of the system vehicle. The inventors of this application have, however, found that errors in determining of the angular shift of the central axis of radar waver radiation will occur in the following cases.

(1) When the preceding vehicle 93 is, as shown in FIG. 15(b), shifted in lateral direction from the system vehicle 91, that is, when the preceding vehicle 93 is traveling with a lateral offset from the longitudinal center line of the system vehicle 91 (which will be referred to below as offset traveling), it will cause an apparent angular shift of central axis of radar wave radiation 95 to be produced.

(2) When the preceding vehicle 93 is, as shown in FIG. 16, traveling on the same lane as the system vehicle 91, but on a curved road, it will cause an angular error θ to be produced even if the central axis of radar wave radiation 95 aligns with the longitudinal center line of the system vehicle 91.

SUMMARY OF THE INVENTION

It is therefore a principal object of the present invention to avoid the disadvantages of the prior art.

It is another object of the present invention to provide an angular shift determining apparatus designed to determine an angular shift of a central axis of radiation of radar waves from an automotive obstacle detection system for determining the position of a target tracked by a radar accurately.

According to one aspect of the present invention, there is provided an angular shift determining apparatus for determining an angular shift of a central axis of radar wave radiation from a radar device used in an automotive obstacle detection system designed to determine a distance to and angular direction of a target tracked by the radar device which comprises: (a) an object identifying circuit that determines a relative position and a relative speed of the target with respect to a system vehicle equipped with the automotive obstacle detection system in cycles based on the distance to and the angular direction of the target determined by the automotive obstacle detection system and that determines whether the target is a moving object or a stationary object based on the relative speed of the target; and (b) an angular shift determining circuit that determines the angular shift of the central axis of radar wave radiation from a longitudinal center line of the system vehicle based on an angular component of the relative position of the moving object as represented by polar coordinates. The angular shift determining circuit also determines an offset of a distribution of relative positions of the moving object, determined by the object identifying circuit in cycles for a preselected period of time when the system vehicle is substantially traveling straight, from the central axis of radar wave radiation in a width-wise direction of the system vehicle to determine an error component of the angular shift of the central axis of radar wave radiation caused by a lateral offset of the moving object from the longitudinal center line of the system vehicle to correct the angular shift of central axis of radar waver radiation by removing the error component therefrom.

In the preferred mode of the invention, the angular shift determining circuit determines an inclination of the distribution of the relative positions of the moving object to the central axis of radar waver radiation to define the inclination as the angular shift of the central axis of radar wave radiation.

The angular shift determining circuit represents the distribution of the relative positions of the moving object with an approximate line to define an angle between the approximate line and the central axis of radar wave radiation as the angular shift of the central axis of radar wave radiation from the longitudinal center line of the system vehicle.

The angular shift determining circuit defines the approximate line using the method of least squares.

The angular shift determining circuit sections the distribution of the relative positions of the moving object into at least two areas based on components of the relative positions of the moving object in a direction of the longitudinal center line of the system vehicle to determine major points of the at least two areas, respectively. The angular shift determining circuit determines the inclination of the distribution of the relative positions of the moving object based on the major points.

The angular shift determining circuit defines an average of the relative positions of the moving object within each of the areas as the major point thereof.

The angular shift determining circuit may section the distribution of the relative positions of the moving object into a first and a second area. The first area is defined by the whole of the distribution, while the second area is defined by one of a portion of the distribution where components of the relative positions of the moving object in a direction of the longitudinal center line of the system vehicle are closer to the system vehicle than an average of the relative positions of the moving object within the whole of the distribution and a portion of the distribution where components of the relative positions of the moving object in the direction of the longitudinal center line of the system vehicle are farther from the system vehicle than the average of the relative positions of the moving object within the whole of the distribution. The angular shift determining circuit determines major points of the first and second areas to determine the inclination of the distribution to the central axis of radar waver radiation based on the major points.

The first area may alternatively be defined by a portion of the distribution where components of the relative positions of the moving object in a direction of the longitudinal center line of the system vehicle are closer to the system vehicle than an average of the relative positions of the moving object within the whole of the distribution, while the second area may alternatively be defined by a portion of the distribution where components of the relative positions of the moving object in the direction of the longitudinal center line of the system vehicle are farther from the system vehicle than the average of the relative positions of the moving object within the whole of the distribution. The angular shift determining circuit determines major points of the first and second areas to determine the inclination of the distribution to the central axis of radar waver radiation based on the major points.

The angular shift determining circuit determines the angular shift of the central axis of radar wave radiation only when the moving object is located away from the system vehicle by a distance which is greater than a given value.

The angular shift determining circuit determines whether the system vehicle is traveling on a curved road or not. When it is determined that the system vehicle is traveling on the curved road, the angular shift determining circuit determines a radius of curvature of the curved road to determine a second error component of the angular shift of the central axis of radar wave radiation caused by the traveling of the system vehicle on the curved road to correct the angular shift of central axis of radar waver radiation by removing the second error component therefrom.

The angular shift determining circuit determines whether the system vehicle is traveling on the curved road or not based on a steered angle of the system vehicle.

According to a second aspect of the present invention, there is provided an angular shift determining apparatus for determining an angular shift of a central axis of radar wave radiation from a radar device used in an automotive obstacle detection system designed to determine a distance to and angular direction of a target tracked by the radar device which comprises: (a) an object identifying circuit that determines a relative position and a relative speed of the target to a system vehicle equipped with the automotive obstacle detection system in cycles based on the distance to and the angular direction of the target determined by the automotive obstacle detection system and that determines whether the target is a moving object or a stationary object based on the relative speed of the target; and (b) an angular shift determining circuit that determines the angular shift of the central axis of radar wave radiation from a longitudinal center line of the system vehicle based on a direction of the relative speed of the target determined as the stationary object. When the system vehicle is traveling on a curve in a road, the angular shift determining circuit also determines the degree of the curve to determine an error component of the angular shift of the central axis of radar wave radiation caused by the traveling of the system vehicle on the curve to correct the angular shift of central axis of radar waver radiation by removing the error component therefrom.

According to the third aspect of the invention, there is provided an angular shift determining apparatus for determining an angular shift of a central axis of radar wave radiation from a radar device used in an automotive obstacle detection system designed to determine a distance to and angular direction of a target tracked by the radar device which comprises: (a) an object identifying circuit that determines a relative position and a relative speed of each target traced by the radar device to a system vehicle equipped with the automotive obstacle detection system in cycles based on the distance to and the angular direction of the target determined by the automotive obstacle detection system and that determines whether the target is a moving object or a stationary object based on the relative speed of the target; and (b) an angular shift determining circuit that determines an angular shift of the central axis of radar wave radiation from a longitudinal center line of the system vehicle as a first angular shift based on the relative position of the target determined as the moving object. The angular shift determining circuit also determines an offset of a distribution of relative positions of the moving object, determined by the object identifying circuit in cycles for a preselected period of time when the system vehicle is substantially traveling straight, from the central axis of radar wave radiation in a width-wise direction of the system vehicle to determine a first error component included in the first angular shift caused by a lateral offset of the moving object from the longitudinal center line of the system vehicle to remove the first error component from the first angular shift to determine a first error-removed angular shift. The angular shift determining circuit determines an angular shift of the central axis of radar wave radiation as a second angular shift based on a direction of the relative speed of the target determined as the stationary object. When the system vehicle is traveling on a curve in a road, the angular shift determining circuit also determines the degree of the curve to remove an error component caused by the traveling of the system vehicle on the curve from the second angular shift to determine a second error-removed angular shift. The angular shift determining circuit mathematically projects an actual angular shift of the central axis of radar wave radiation based on the first and second error-removed angular shifts.

In the preferred mode of the invention, the angular shift determining circuit determines whether the system vehicle is traveling on the curved road or not based on a steered angle of the system vehicle.

The angular shift determining circuit may alternatively determine whether the system vehicle is traveling on the curved road or not based on a relative locus of the target determined as the stationary object with respect to the system vehicle.

An angular direction correcting circuit may be provided that corrects the angular direction of the target determined by the automotive obstacle detection system based on the actual angular shift of the central axis of radar wave radiation mathematically projected by the angular shift determining circuit.

The angular shift determining circuit determines the first and second error-removed angular shifts in cycles for a preselected period of time to determine a first and a second average angular shift. The angular shift determining circuit mathematically projects the actual angular shift of the central axis of radar wave radiation based on the first and second average angular shifts.

The angular shift determining circuit may mathematically project the actual angular shift of the central axis of radar wave radiation based a value derived by a weighted averaging operation on the first and second error-removed angular shifts.

According to the fourth aspect of the invention, there is provided an automotive obstacle detection apparatus which comprises: (a) a radar device that transmits a radar wave over a given detection range across a central axis at given angular intervals; (b) a distance determining circuit that determines a distance to a target within the given detection range based on a time interval between transmission of the radar wave and reception of the radar wave reflected from the given detection range; (c) a storage device that stores a relation between the distance to the target determined by the distance determining circuit and an angular direction of the radar wave transmitted by the radar wave; (d) an object identifying circuit that determines a relative position and a relative speed of the target to a subject vehicle equipped with the obstacle detection apparatus in cycles based on the distance to and the angular direction of the target stored in the storage device and that determines whether the target is a moving object or a stationary object based on the relative speed of the target; (e) an angular shift determining circuit that determines an angular shift of the central axis of radar wave radiation from a longitudinal center line of the subject vehicle based on the relative position of the moving object, the angular shift determining circuit also determining an offset of a distribution of relative positions of the moving object, determined by the object identifying circuit in cycles for a preselected period of time when the subject vehicle is substantially traveling straight, from the central axis of radar wave radiation in a width-wise direction of the subject vehicle to determine an error component of the angular shift of the central axis of radar wave radiation caused by a lateral offset of the moving object from the longitudinal center line of the system vehicle to mathematically project an actual angular shift of central axis of radar waver radiation by removing the error component therefrom; and (f) an angular direction correcting circuit that corrects the angular direction of the target by modifying the relation between the distance to the target and the angular direction of the radar wave transmitted by the radar wave stored in the storage device so as to eliminate the actual angular shift of the central axis of radar waver radiation.

In the preferred mode of the invention, a coordinate transformation circuit is further provided that subjects the distance to and the angular direction of the target to a given operation to determine a position of the target on a rectangular coordinate plane. The angular direction correcting circuit modifies the given operation of the coordinate transformation circuit so as to eliminate the actual angular shift of the central axis of radar waver radiation to correct the angular direction of the target.

The angular shift determining circuit determines an angular shift of the central axis of radar wave radiation from the longitudinal center line of the system vehicle as a first angular shift based on the relative position of the target determined as the moving object to remove the error component caused by the lateral offset of the moving object from the longitudinal center line of the system vehicle from the first angular shift to determine a first error-removed angular shift. The angular shift determining circuit determines an angular shift of the central axis of radar wave radiation as a second angular shift based on a direction of the relative speed of the target determined as the stationary object. When the system vehicle is traveling on a curve in a road, the angular shift determining circuit also determines the degree of the curve to remove an error component caused by the traveling of the system vehicle on the curve from the second angular shift to determine a second error-removed angular shift. The angular shift determining circuit determines the actual angular shift based on the first and second error-removed angular shifts.

According to the fifth aspect of the invention, there is provided an automotive intervehicle distance control apparatus which comprises: (1) an automotive obstacle detection apparatus including (a) a radar device that transmits a radar wave over a given detection range across a central axis at given angular intervals, (b) a distance/angle determining circuit that determines a distance to and an angular direction of a target within the given detection range based on a signal derived by reflection of the radar wave from the given detection range, and (c) an object identifying circuit that determines a relative position and a relative speed of the target to a vehicle controlled by the automotive intervehicle distance control apparatus in cycles based on the distance to and the angular direction of the target and that determines whether the target is a moving object or a stationary object based on the relative speed of the target; (2) an angular shift determining circuit that determines an angular shift of the central axis of radar wave radiation from a longitudinal center line of the controlled vehicle based the relative position of the moving object, the angular shift determining circuit also determining an offset of a distribution of relative positions of the moving object determined by the object identifying circuit in cycles for a preselected period of time from the central axis of radar wave radiation in a width-wise direction of the controlled vehicle to determine an error component of the angular shift of the central axis of radar wave radiation caused by a lateral offset of the moving object from the longitudinal center line of the system vehicle to mathematically project an actual angular shift of central axis of radar waver radiation by removing the error component from the angular shift of the central axis of radar wave radiation; (3) a correcting circuit that corrects the distance to and the angular direction of the target so as to eliminate the actual angular shift of the central axis of radar wave radiation; and (4) an intervehicle distance control circuit that determines whether the target tracked by the radar device is a preceding vehicle traveling ahead of the controlled vehicle or not based on the distance to and the angular direction of the target corrected by the correcting circuit when an intervehicle distance control mode is entered, when it is determined that the target is the preceding vehicle, the intervehicle distance control circuit controlling speed of the controlled vehicle at a target change rate to bring a distance between the preceding vehicle and the controlled vehicle into agreement with a target distance.

In the preferred mode of the invention, the angular shift determining circuit determines an angular shift of the central axis of radar wave radiation from the longitudinal center line of the system vehicle as a first angular shift based on the relative position of the target determined as the moving object to remove the error component caused by the lateral offset of the moving object from the longitudinal center line of the system vehicle from the first angular shift to determine a first error-removed angular shift. The angular shift determining circuit determines an angular shift of the central axis of radar on a radiation as a second angular shift based on a direction of the relative speed of the target determined as the stationary object. When the system vehicle is traveling on a curve in a road, the angular shift determining circuit also determines the degree of the curve to remove an error component caused by the traveling of the system vehicle on the curve from the second angular shift to determine a second error-removed angular shift and determines the actual angular shift based on the first and second error-removed angular shifts.

The intervehicle distance control circuit changes the target change rate of the speed of the controlled vehicle according to the actual angular shift of the central axis of radar wave radiation.

The intervehicle distance control circuit may decrease the target change rate based on the actual angular shift of the central axis of radar wave radiation.

The intervehicle distance control circuit prohibits the controlled vehicle from entering the intervehicle distance control mode when the actual angular shift of the central axis of radar wave radiation shows a given abnormal value.

The intervehicle distance control circuit prohibits the controlled vehicle from entering the intervehicle distance control mode when the actual angular shift of the central axis of radar wave radiation has a change greater than a given value within a given period of time.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 3 is a flowchart of a program which determines an angular shift correction value to correct an angular shift of a central axis of radar wave radiation logically;

FIG. 9 is a flowchart of a sub-program to perform intervehicle distance control;

DESCRIPTION OF THE PREFERRED EMBODIMENT

Figure 1:
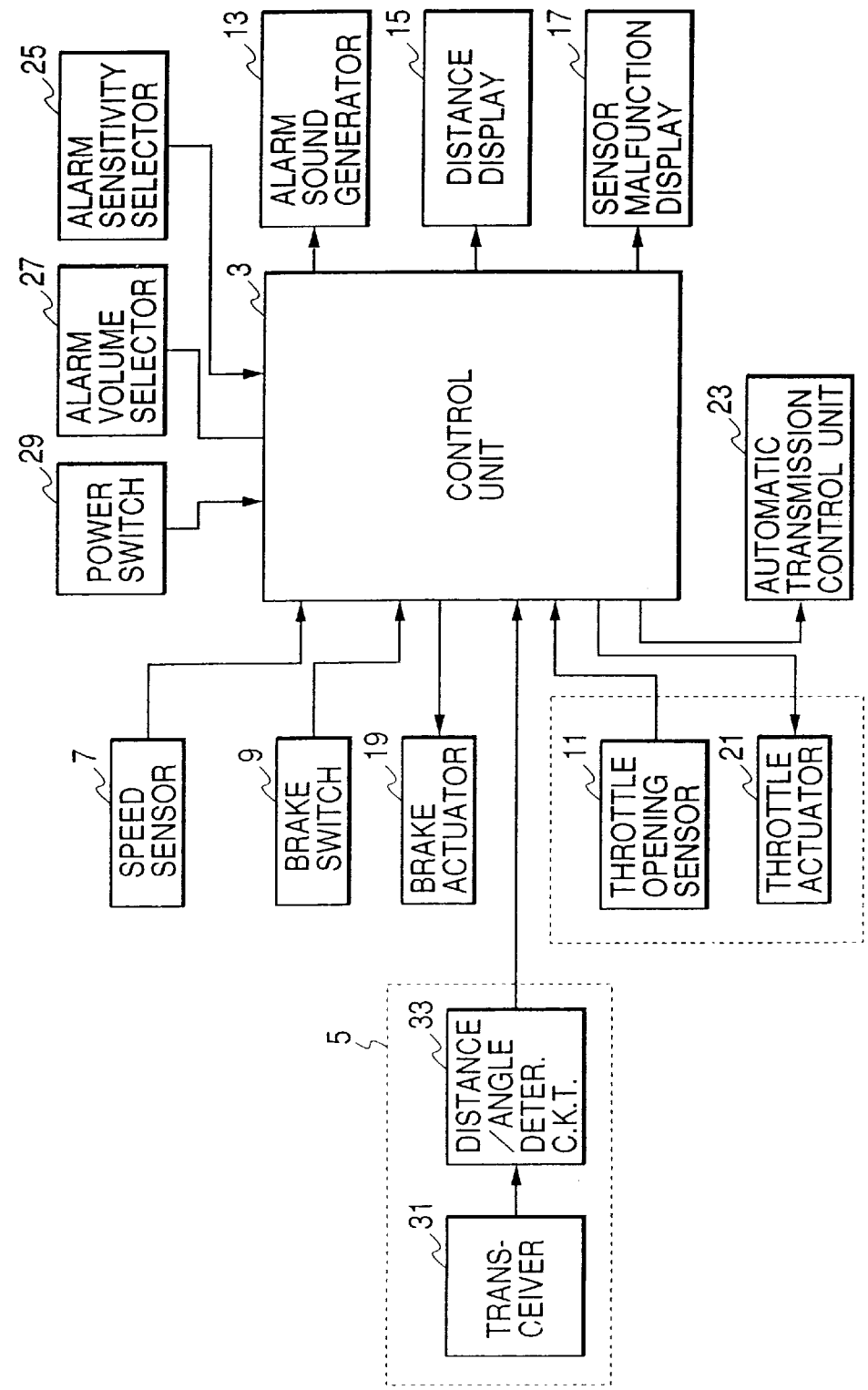
FIG. 1 is a block diagram which shows an automotive obstacle detection system according to the present invention.
Figure 2:
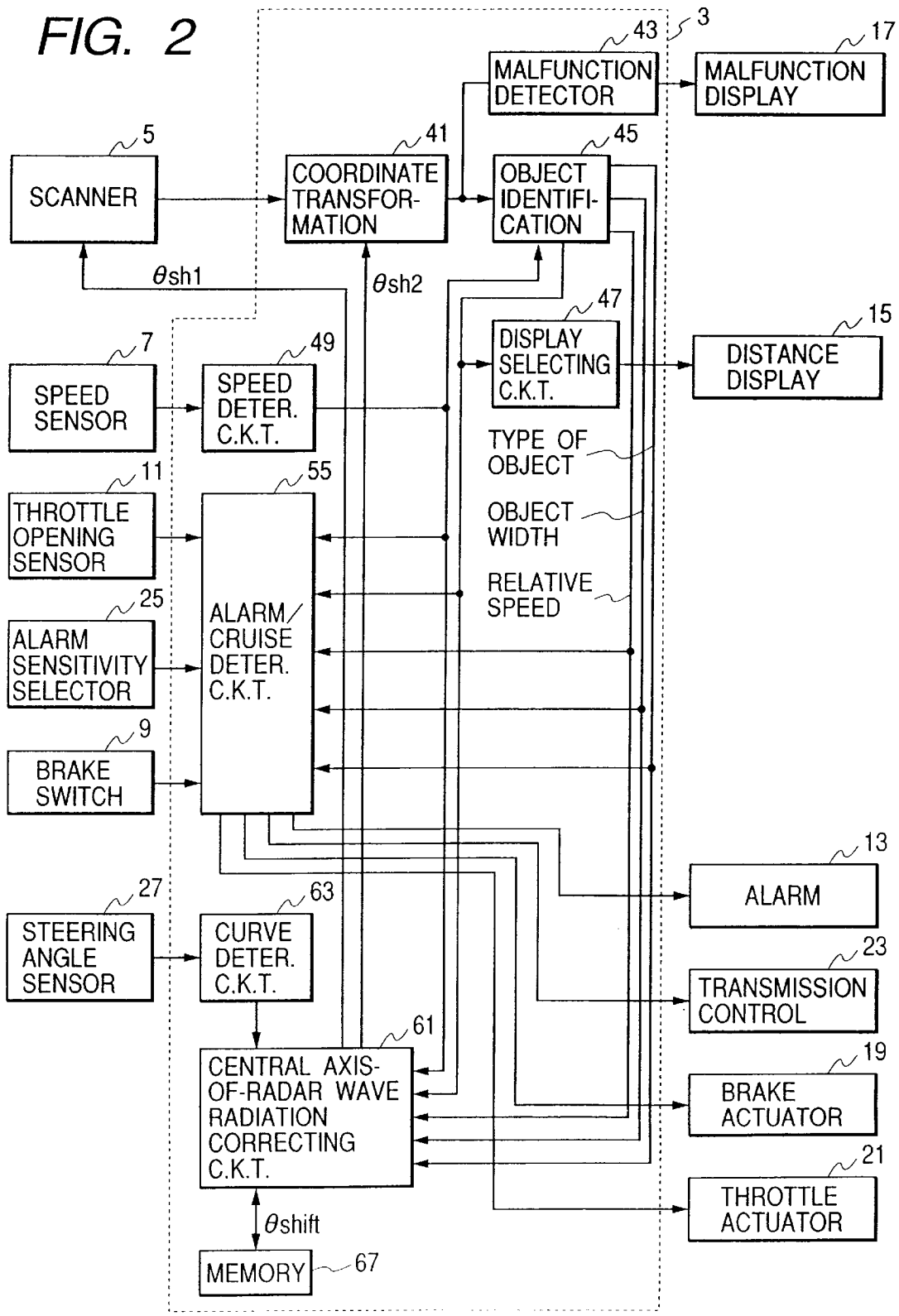
FIG. 2 is a block diagram which shows a circuit arrangement of a control unit of the automotive obstacle detection system in FIG. 1.

Referring now to the drawings, particularly to FIGS. 1 and 2, there is shown an automotive obstacle detection system 1 which is designed to track an object or obstacle present ahead of a system vehicle for raising an alarm to inform a vehicle operator of the possibility of collision when a distance between the object and the system vehicle reaches a warning distance and for controlling the speed of the system vehicle to keep the intervehicle distance constant.

The automotive obstacle detection system 1 includes a control unit 3 provided with a microcomputer, an input/output interface circuit, driving circuits, and detection circuits which can be of any known arrangements, and explanation thereof in detail will be omitted here.

The control unit 3 receives detection signals outputted from a distance/azimuth measuring scanner 5, a speed sensor 7, a brake switch 9, and a throttle opening sensor 11, and provides control signals to an alarm sound generator 13, a distance display 15, a sensor malfunction display 17, a brake actuator 19, a throttle actuator 21, and an automatic transmission control unit 23.

The automotive obstacle detection system 1 further includes an alarm sensitivity selector 25, a steering angle sensor 27, and a power switch 29. The alarm sensitivity selector 25 selects the sensitivity in alarm decision made by the control unit 3. The steering sensor 27 monitors a steered angle of a steering wheel (not shown) to provide a signal indicative thereof to the control unit 3. The power switch 29 is designed to be turned on manually or in response to activation of an ignition switch to supply the power to the control unit 3.

The distance/azimuth measuring scanner 5 is implemented with a radar unit which includes a transceiver 31 and a distance/angle determining circuit 33. The transceiver 31 transmits a laser beam forward of the system vehicle to scan an obstacle detectable zone ranging a given angle across an optical axis (i.e., the central axis of radar wave radiation) and receives a reflected beam from an object or target present ahead of the system vehicle. The distance/angle determining circuit 33 determines the distance to a tracked object based on the length of time between the transmission of the laser beam and reception thereof. This type of radar unit is well known in the art, and further explanation thereof in detail will be omitted here. The distance/azimuth measuring scanner 5 may alternatively be implemented with a socalled nomopulse type radar which has a plurality of receivers and measures the distance to and azimuth of a target based on the difference in intensity and phase of received signals, or with a radar using a microwave or a supersonic wave.

The control unit 3 is responsive to a signal from the distance measuring/azimuth scanner 5 to determine whether an object such as a moving or stationary preceding vehicle, a guard rail, or a pole installed on the side of a road lies within a warning zone for a preselected period of time or not. If so, the control unit 3 concludes that there is a high possibility of collision, and raises an alarm to the vehicle operator. In addition, the control unit 3 may perform cruise control that controls the brake actuator 19, the throttle actuator 21, and/or the automatic transmission control unit 23 to regulate the speed of the system vehicle according to the status of the object.

The control unit 3, as shown in FIG. 2, includes a coordinate transformation circuit 41, a sensor malfunction determining circuit 43, an object identifying circuit 45, a distance display object selecting circuit 47, a speed determining circuit 49, an alarm/cruise determining circuit 55, a radius-of-curvature determining circuit 63, a central axis-of-radar wave radiation correcting circuit 61, and a non-volatile memory 67.

The coordinate transformation circuit 41 receives from the distance/azimuth measuring scanner 5 data indicative of the distance to and azimuth angle of a target present ahead of the system vehicle to transform it into x- and y-coordinates on an X-Y rectangular coordinate plane whose origin is defined on the system vehicle. The sensor malfunction determining circuit determines whether values transferred on the X-Y coordinate plane represent normal values or not, and provides a signal indicative thereof to the sensor malfunction display 17.

The object identifying circuit 45 determines a type of the target, coordinates (X, Y) of central position of the target, and a relative speed (Vx, Vy) of the target based on the X-Y coordinate data provided by the coordinate transformation circuit 41. The determination of the type of the target is made to determine whether the target is a moving object or a stationary object. When a plurality of targets are detected, the distance display object selecting circuit 47 selects ones which will interfere with traveling of the system vehicle based on the central positions of the respective targets to have the distance display 15 displays distances to the selected targets. The relative speed (Vx, Vy) of the target is determined based on the speed V of the system vehicle measured by the speed determining circuit 49 and the coordinates (X, Y) of the central position of the target.

The alarm/cruise determining circuit 55 determines in an alarm mode whether an alarm is to be raised or not or determines in a cruise mode the contents of speed control based on the speed of the system vehicle, the relative speed between the system vehicle and the target, the relative acceleration of the target, the central position of the target, the type of the target, an output from the brake switch 9, an opening degree of the throttle sensed by the throttle opening sensor 11, and a value of sensitivity set by the alarm sensitivity selector 25. When it has been concluded that an alarm needs to be raised, the alarm/cruise determining circuit 55 provides an alarm generating signal to the alarm sound generator 13. Alternatively, the alarm/cruise determining circuit 55, in the cruise mode, provides control signals to the automatic transmission control unit 23, the brake actuator 19, and the throttle actuator 21 to perform given cruise control.

The steering angle sensor 27 measures a steered angle of the steering wheel and provides a signal indicative thereof to the radius-of-curvature determining circuit 63. The radius-of-curvature determining circuit 63 uses the speed of the system vehicle determined by the vehicle speed determining circuit 49 and the steered angle determined by the steered angle sensor 27 to calculate the radius of curvature of a road on which the system vehicle is traveling. The central axis-of-radar wave radiation correcting circuit 61 determines an angular shift of the central axis of radar wave radiation from the distance/azimuth measuring scanner 5 from the longitudinal center line of the system vehicle based on the speed of the system vehicle, the relative speed of the target, the central position of the target, the type of the target, and the radius of curvature determined by the radius-of-curvature determining circuit 63 and provides shift correcting signals, as will be described later in detail, to the coordinate transformation circuit 41 and the distance/azimuth measuring scanner 5 to compensate for the angular shift of the central axis of radar wave radiation. The non-volatile memory 67 stores therein data used in determining the shift correction value in the central axis-of-radar wave radiation correcting circuit 61.

FIG. 3 shows a flowchart of a program or logical steps performed by the central axis-of-radar wave radiation correcting circuit 61 in a cycle of 200 msec. in response to turning on of the power switch 29.

After entering the program, the routine proceeds to step 1000 wherein an angular shift correction value $\theta_{shift}$ that corresponds to an angle between the central axis of radar wave radiation makes and the longitudinal center line of the system vehicle is determined. The routine proceeds to step 2000 wherein data on the distance to and angular direction of a target tracked by the distance/azimuth measuring scanner 5 is corrected so as to compensate for the angular shift $\theta_{shift}$. If the angular shift $\theta_{shift}$ is not determined in step 1000, then the routine terminates without executing step 2000. In the following discussion, it is assumed that the distance to and directional angle or azimuth of a tracked object indicated by output signals from the distance/azimuth measuring scanner 5 range from 0 m to 150 m (resolution: 0.1 m) and from −8° to 8° (resolution: 0.5°), respectively.

Figure 4:
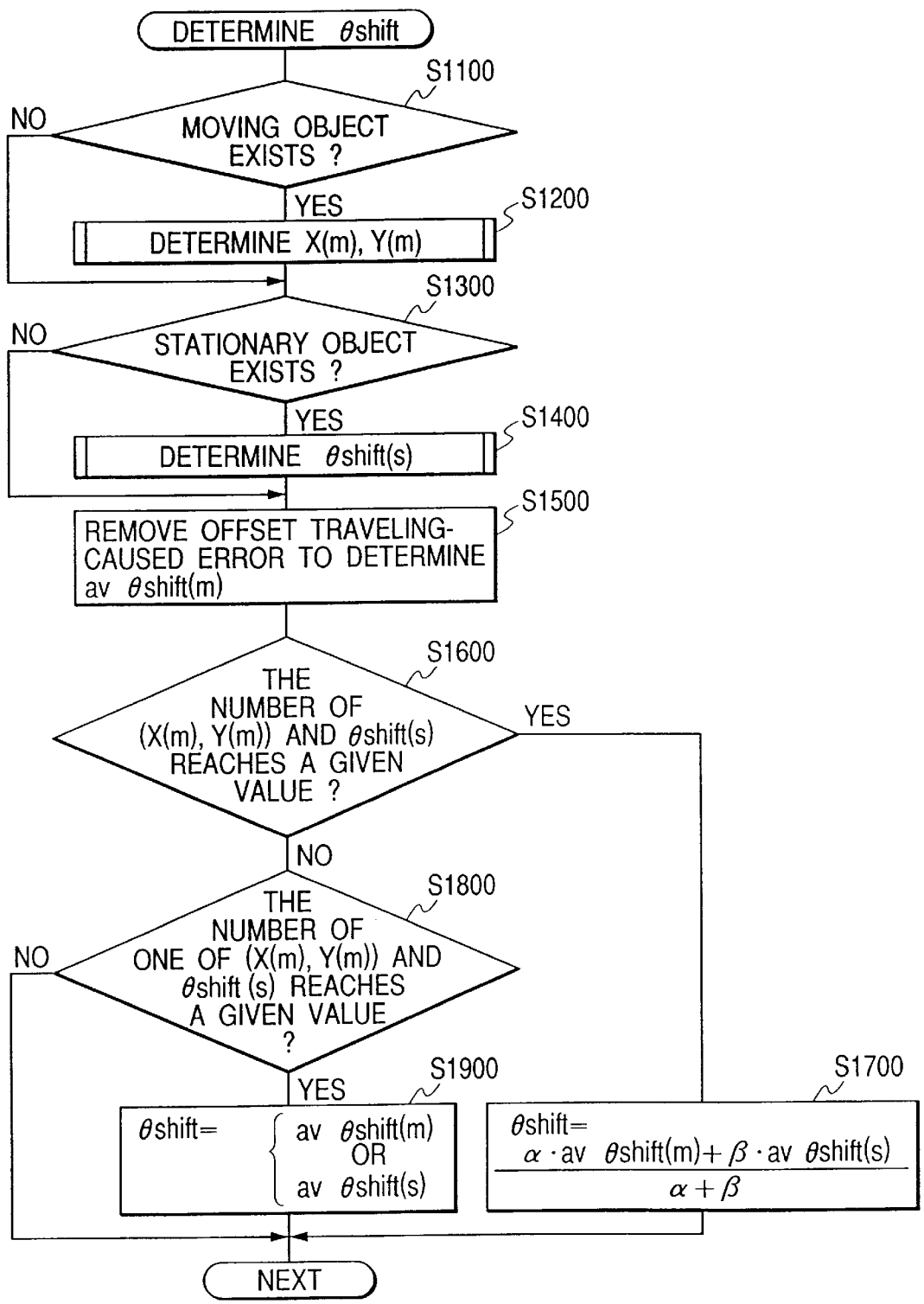
FIG. 4 is a flowchart of a sub-program performed in step 1000 of FIG. 3 to determine the angular shift correction value.

FIG. 4 shows the details of an operation in step 1000.

First, in step 1100, it is determined whether an object exists in the obstacle detectable zone or not which meets the following conditions:

(a) it continues to be tracked for five (5) seconds or more (b) 1.2 m<object width<2.8 m If a YES answer is obtained meaning that an object satisfying both the conditions (a) and (b) is tracked by the distance/azimuth measuring scanner 5, then the routine proceeds to step 1200 wherein a curve-caused error corrected moving object relative position ($X_{(m)}$, $Y_{(m)}$), as will be described in detail later, is calculated based on the central coordinates (X, Y) of the target.

Alternatively, if a NO answer is obtained in step 1100 or after step 1200, the routine proceeds directly to step 1300 wherein it is determined whether a stationary object exists in the obstacle detectable zone or not which continues to be tracked for one (1) second or more. If a YES answer is obtained, then the routine proceeds to step 1400 wherein a stationary object angular shift correction value $\theta_{shift(s)}$, as will be described in detail later, is calculated based on the relative speed (Vx, Vy) of the target.

If a NO answer is obtained in step 1300 or after step 1400, the routine proceeds to step 1500. In step 1500, after the program is performed several times for a preselected period of time, and a plurality of curve-caused error corrected moving object relative positions ($X_{(m)}$, $Y_{(m)}$) are derived with respect to one target through step 1200, the distribution of the curve-caused error corrected moving object relative positions ($X_{(m)}$, $Y_{(m)}$) derived for the preselected period of time is determined to evaluate the influence of the offset traveling on the determination of the curve-caused error corrected moving object relative position ($X_{(m)}$, $Y_{(m)}$). Next, the influence of the offset traveling is removed from the curve-caused error corrected moving object relative positions ($X_{(m)}$, $Y_{(m)}$) to determine a moving object angular shift correction values $av\theta_{shift(m)}$ in the following manner.

When the angular shift of central axis of radar wave radiation from the distance/azimuth measuring scanner 5 is determined based on the relative position (X, Y) of the target, it will contain two inherent components: a physical misalignment of the scanner 5 caused by error in installation in the system vehicle and an apparent angular shift of central axis of radar wave radiation caused by the offset traveling which are difficult to distinguish by the relative position (X, Y) of the target. In order to remove the apparent angular shift from the angular shift of central axis of radar wave radiation, the distribution of relative positions (X, Y) of the target determined for the preselected period of time is mathematically defined to find an offset of the distribution in a lateral direction from the central axis of radar wave radiation as a factor of the apparent angular shift, which will be discussed below in detail.

Figure 11A:
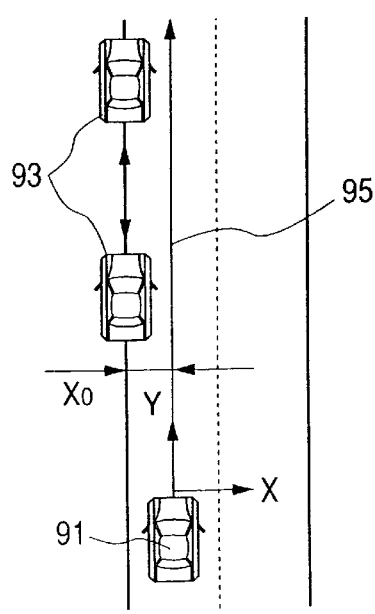
FIG. 11(a) is an illustration which shows a preceding vehicle is traveling along an offset line shifted horizontally from a system vehicle.
Figure 11B:
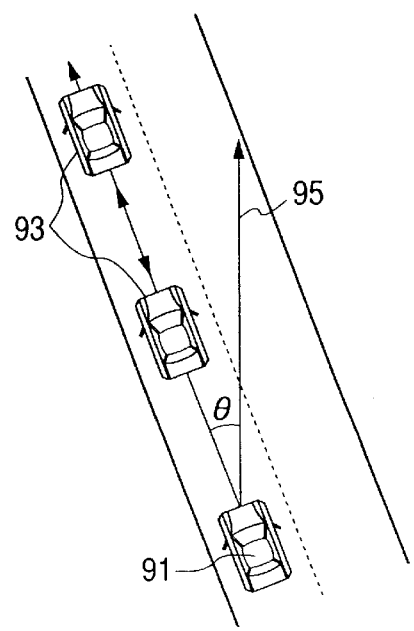
FIG. 11(b) is an illustration which shows a preceding vehicle is traveling just ahead of the system vehicle.
Figure 11C:
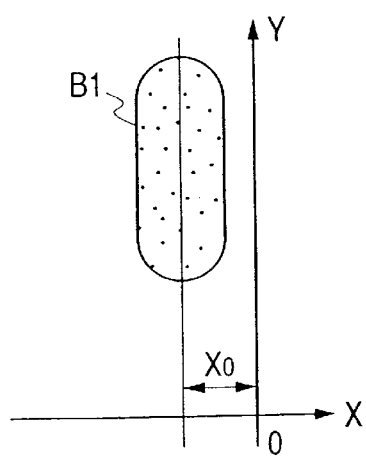
FIG. 11(c) is an illustration which shows a distribution of relative positions of the preceding vehicle of FIG. 11(a) calculated for a given period of time.
Figure 11D:
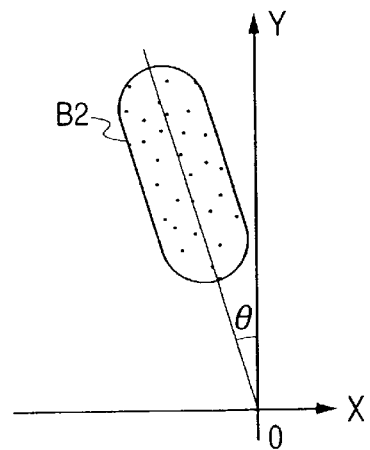
FIG. 11(d) is an illustration which shows a distribution of relative positions of the preceding vehicle of FIG. 11(b) calculated for a given period of time.

When the preceding vehicle 93 is, as shown in FIG. 11(a), traveling along an offset line shifted horizontally from the system vehicle 91, an offset X0 or lateral interval in the X-axis direction between the offset line and the longitudinal center line of the system vehicle 91 will be constant regardless of a change in intervehicle distance between the preceding vehicle 93 and the system vehicle 91. FIG. 11(c) shows the distribution B1 of relative positions of the preceding vehicle 93 of FIG. 11(a) calculated in cycles for a preselected period of time. When the preceding vehicle 93 is, as shown in FIG. 11(b), traveling just ahead of the system vehicle 91, that is, along the longitudinal center line of the system vehicle 91, an angular shift θ of the central axis of radar wave radiation 95 from the longitudinal center line of the system vehicle 91 calculated based on the relative position of the preceding vehicle 93 shows a constant value even when the intervehicle distance is changed. FIG. 11(d) shows the distribution B2 of relative positions of the preceding vehicle 93 of FIG. 11(b) calculated in cycles for the preselected period of time.

Therefore, the above described inherent components contained in the angular shift of central axis of radar wave radiation determined based on the relative position (X, Y) of the target, i.e., the physical misalignment of the scanner 5 and the apparent angular shift of central axis of radar wave radiation due to the offset traveling are easily distinguished by comparing orientations of the positional distributions B1 and B2. Specifically, the positional distribution B1 has a longitudinal center line which extends parallel to the Y-axis with the offset X0, while the positional distribution B2 has a longitudinal center line which extends at the angle θ to the Y-axis. One of the two components of the angular shift of central axis of radar wave radiation caused by the offset traveling may, thus, be determined as a function of a shift of the positional distribution B1 or offset X0 in the lateral direction of the system vehicle (i.e., the X-axis direction), while the other component caused by the physical misalignment of the scanner 5 may be determined as a function of an angular displacement of the positional distribution B2 from the central axis of radar wave radiation 95 (i.e., the Y-axis).

As apparent from the above discussion, in step 1500, the moving object angular shift correction values $av\theta_{shift(m)}$ from which the apparent angular shift caused by the offset traveling is removed is calculated by determining the angular displacement or inclination of the distribution of the curve-caused error corrected moving object relative positions ($X_{(m)}$, $Y_{(m)}$) to the Y-axis.

The determination of the inclination of distribution of the curve-caused error corrected moving object relative positions ($X_{(m)}$, $Y_{(m)}$) to the Y-axis (i.e., the moving object angular shift correction values $av\theta_{shift(m)}$) may be made in several ways as discussed below.

Figure 12A:
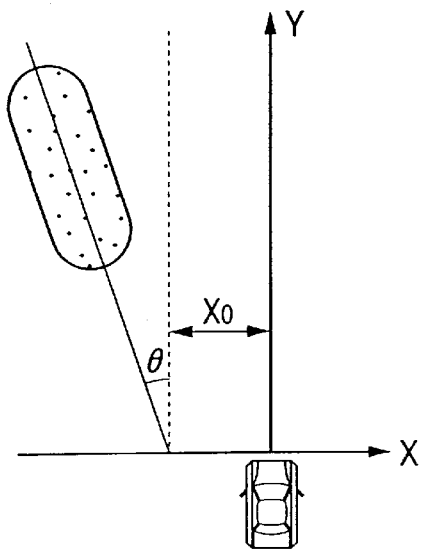
FIG. 12(a) is an illustration which shows a distribution of relative positions of a target whose inclination to Y-axis may be represented by an approximate line.

(1) The positional distribution of the target is, as shown in FIG. 12(a), mathematically approximated to a straight line or approximate line using, for example, the method of least squares when the system vehicle is substantially traveling straight. The angle θ between the approximate line and the Y-axis (i.e., the central axis of radar wave radiation) is determined to determine the inclination of the distribution as the moving object angular shift correction values $av\theta_{shift(m)}$.

Figure 12B:
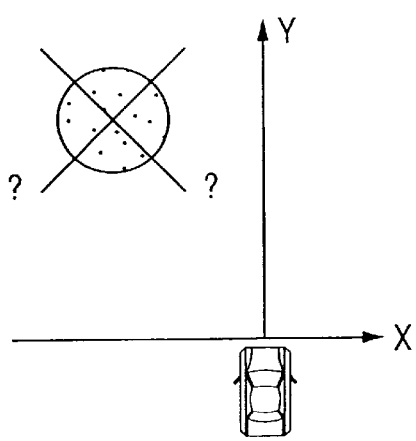
FIGS. 12(b) and 12(c) show distributions of relative positions of a target whose inclinations to Y-axis are difficult to represent using an approximate line.
Figure 12C:
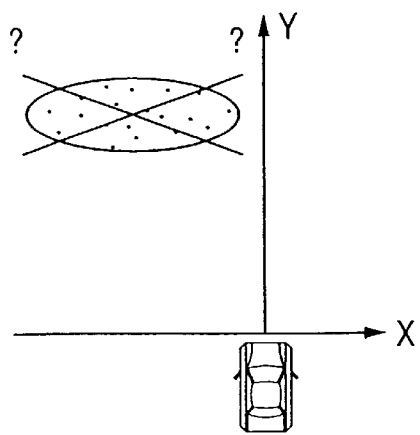

(2) There are several cases where it is impossible to represent the positional distribution of the target using an approximate line. For example, a circular distribution, as shown in FIG. 12(b), and an oval distribution, as shown in FIG. 12(c), having a major axis extending in the X-axis direction are difficult to represent using approximate lines, respectively. In these cases, an inclination of each distribution relative to the Y-axis may be determined using a line passing through average values of relative positions of the target in a plurality of areas into which the distribution is sectioned. For example, the distribution is sectioned into a first area defined by the whole of the distribution and a second area defined by either of a portion of the distribution where y-coordinates of relative positions of the target are closer to the X-axis than the average of y-coordinates of relative positions of the target within the first area and a portion of the distribution where y-coordinates of relative positions of the target therewithin are farther from the X-axis than the average of y-coordinates of relative positions of the target within the first area. Next, a line passing through average values of relative positions of the target within the first and second areas is defined to determine the angle θ between the line and the Y-axis as the inclination of the distribution relative to the Y-axis. The distribution may alternatively be sectioned into two areas which do not overlap at all, which is exemplified in FIGS. 13(a) to 13(c) and FIGS. 14(a) to 14(c).

Figure 13A:
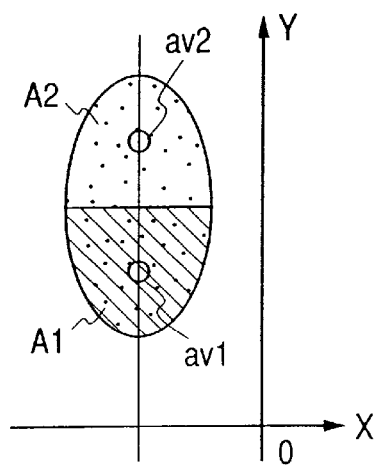
FIGS. 13(a), 13(b), and 13(c) each show sectioning of a distribution of relative position of a target to define a line for determining an inclination of the distribution to Y-axis when a preceding vehicle is traveling with a lateral offset from the longitudinal center line of a system vehicle, and the central axis of radar wave radiation is alignment with the longitudinal center line of the system vehicle.
Figure 13B:
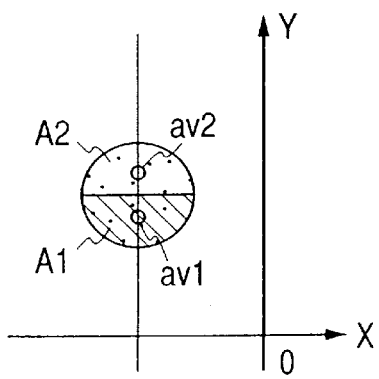
Figure 13C:
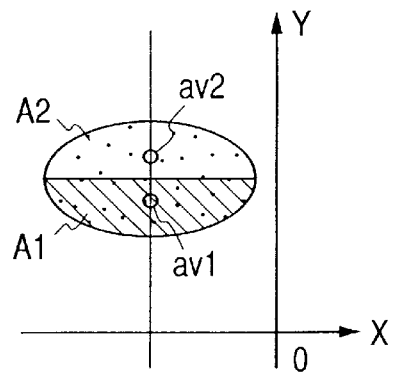

FIGS. 13(a) to 13(c) each illustrate for the case where a preceding vehicle is traveling with a lateral offset from the longitudinal center line of the system vehicle, and the central axis of radar wave radiation from the distance/azimuth measuring scanner 5 is alignment with the longitudinal center line of the system vehicle.

In each of the distributions, the first area A1 is defined by a portion of the distribution where y-coordinates of relative positions of the target are closer to the X-axis than the average value of relative positions of the target within the whole of the distribution, while the second area A2 is defined by the remainder of the distribution. A line passing through average value av1 and av2 of relative positions of the target within the first and second areas A1 and A2 extends parallel to the Y-axis because of the alignment of the central axis of radar wave radiation with the longitudinal center line of the system vehicle.

Figure 14A:
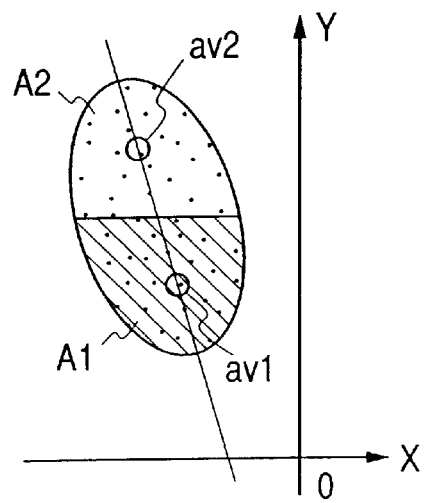
FIGS. 14(a), 14(b), and 14(c) each show sectioning of a distribution of relative position of a target to define a line for determining an inclination of the distribution to Y-axis when a preceding vehicle is traveling just ahead of a system vehicle without a lateral offset, and the central axis of radar wave radiation is out of alignment with the longitudinal center line of the system vehicle.
Figure 14B:
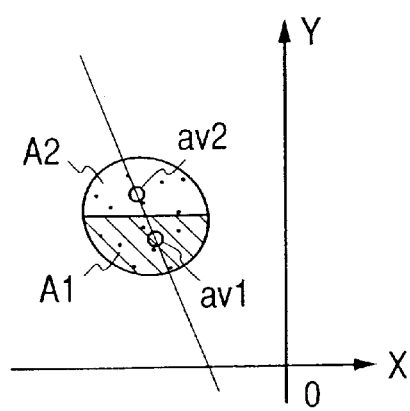
Figure 14C:
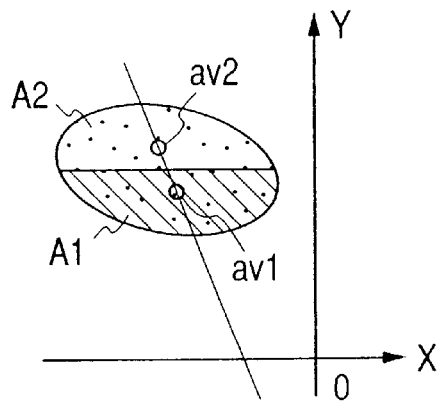
Figure 15A:
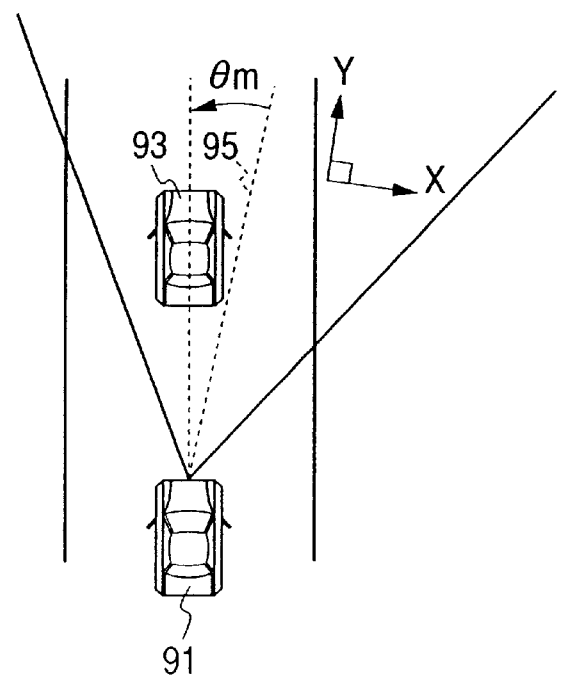
FIG. 15(a) illustrates an error in detection of a preceding vehicle traveling just ahead of a system vehicle when the central axis of radar wave radiation is shifted from the longitudinal center line of the system vehicle.
Figure 15B:
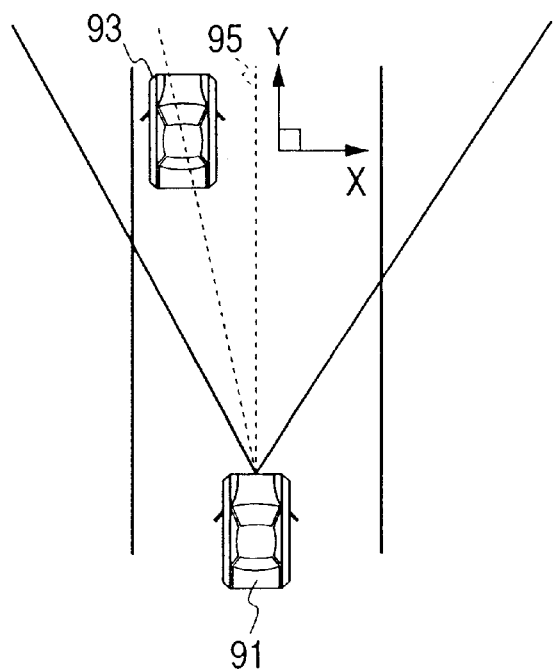
FIG. 15(b) illustrates an apparent angular shift of a central axis of radar wave radiation produced when a preceding vehicle is shifted in lateral direction from a system vehicle.

FIGS. 14(a) to 14(c) each illustrate for the case where a preceding vehicle is traveling just ahead of the system vehicle without the lateral offset, and the central axis of radar wave radiation from the distance/azimuth measuring scanner 5 is out of alignment with the longitudinal center line of the vehicle.

Like the ones shown in FIGS. 13(a) to 13(c), the first area A1 is defined by a portion of the distribution where y-coordinates of relative positions of the target are closer to the X-axis than the average value of relative positions of the target within the whole of the distribution, while the second area A2 is defined by the remainder of the distribution. A line passing through average values av1 and av2 of relative positions of the target within the first and second areas A1 and A2 extends at a certain angle to the Y-axis because of the misalignment of the central axis of radar wave radiation with the longitudinal center line of the system vehicle.

FIGS. 13(a) to 14(c) show the sectioning of the distribution of relative positions of the target into the two areas A1 and A2. However, when the distribution is sectioned into more than three areas, average values of relative positions of the target within all the areas may not align with each other. In this case, an inclination of the distribution to the Y-axis (i.e., the central axis of radar wave radiation) may be determined using an approximate line passing near the average values. The sectioning of the distribution into more than three areas is preferable to increasing the accuracy in determination of the inclination of the distribution to the central axis of radar wave radiation.

Figure 10:
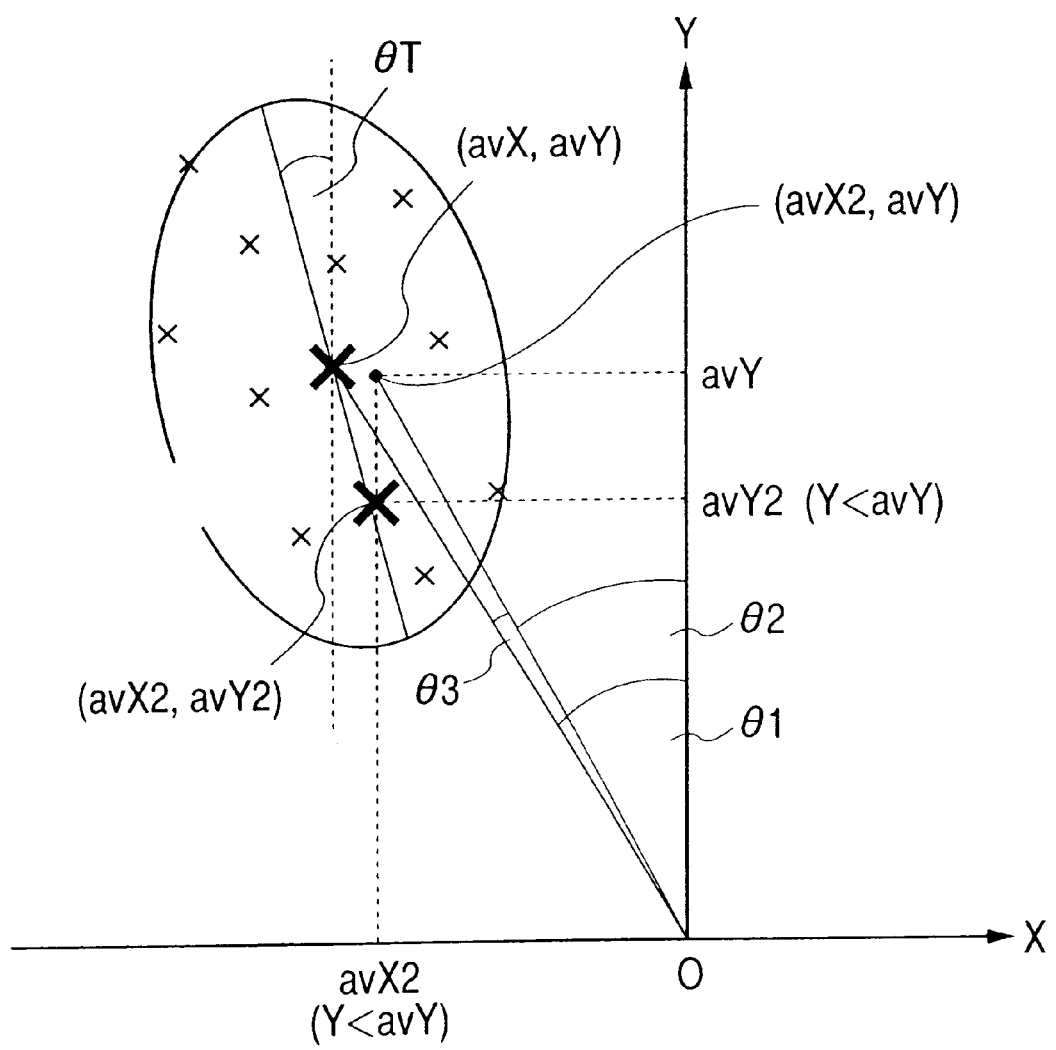
FIG. 10 is an illustration for explanation of a graphic technique to eliminate an error component of an angular shift of a central axis of radar wave radiation caused by offset traveling.

(3) Unlike the above distribution sectioning methods (1) and (2), removal of the component of the angular shift of central axis of radar wave radiation caused by the offset traveling from the moving object angular shift correction values $\theta_{shift(m)}$ may be achieved using a graphic technique as shown in FIG. 10.

First, an average position (avX, avY) of the target within the whole of the distribution on the x-y coordinate plane defined by the coordinate transformation circuit 41. The angle which a line passing through the average position (avX, avY) and the origin (0, 0) makes with the Y-axis is defined as an angular shift learning value θ1.

Next, a portion of the distribution where y-coordinates of relative positions of the targets are smaller than an average y-coordinate avY of relative positions of the target within the whole of the distribution is selected to determine an average position (avX2, avY2) of the target therewithin. The angle which a line passing through a point (avX2, avY) and the origin (0, 0) makes with the Y-axis is defined as an offset traveling-caused angular shift θ2.

The offset traveling-caused angular shift θ2 is subtracted from the angular shift learning value θ1 to determine an angular shift learning value θ3 (i.e., the moving object angular shift correction value $av\theta_{shift(m)}$). This graphic angular shift determination technique estimates the offset traveling-caused angular shift θ2 more greatly than an actual value so that an angular shift learning value θ3 will be always smaller than an actual angular shift θT of central axis of radar wave radiation. However, since the orientation of the angular shift learning value θ3 is the same as that of the actual angular shift θT, it is possible to determine the actual angular shift θT of central axis of radar wave radiation using the angular shift learning value θ3 by repeating an correcting operation.

Referring back to FIG. 4, after the moving object angular shift correction values $av\theta_{shift(m)}$ is determined in step 1500, the routine proceeds to step 1600 wherein it is determined whether the number of curve-caused error corrected moving object relative positions $(X_{(m)}, Y_{(m)})$ derived in step 1200 and the number of stationary object angular shift correction values $\theta_{shift(s)}$ derived in step 1400 both have reached a given value or not. If a YES answer is obtained, then the routine proceeds to step 1700 wherein the moving object angular shift correction value $av\theta_{shift(m)}$ and the average value $av\theta_{shift(s)}$ of the stationary object angular shift correction values $\theta_{shift(s)}$ are averaged with suitable weighting to determine an angular shift correction value $\theta_{shift}$ using the following equation.

$$\theta_{shift}=[\alpha \cdot av\theta_{shift(m)}+\beta \cdot av\theta_{shift(s)}]/(\alpha+\beta)$$

Alternatively, if a NO answer is obtained in step 1600, then the routine proceeds to step 1800 wherein it is determined whether either of the number of curve-caused error corrected moving object relative positions $(X_{(m)}, Y_{(m)})$ derived in step 1200 and the number of stationary object angular shift correction values $\theta_{shift(s)}$ derived in step 1400 has reached the given value or not. If a YES answer is obtained, then the routine proceeds to step 1900. In step 1900, when the number of curve-caused error corrected moving object relative positions $(X_{(m)}, Y_{(m)})$ has reached the given value, the moving object angular shift correction value $av\theta_{shift(m)}$ is determined as the angular shift correction value $\theta_{shift}$. Alternatively, when the number of stationary object angular shift correction values $\theta_{shift(s)}$ has reached the given value, the average value $av\theta_{shift(s)}$ of the stationary object angular shift correction values $\theta_{shift(s)}$ is determined as the angular shift correction value $\theta_{shift}$.

Figure 5:
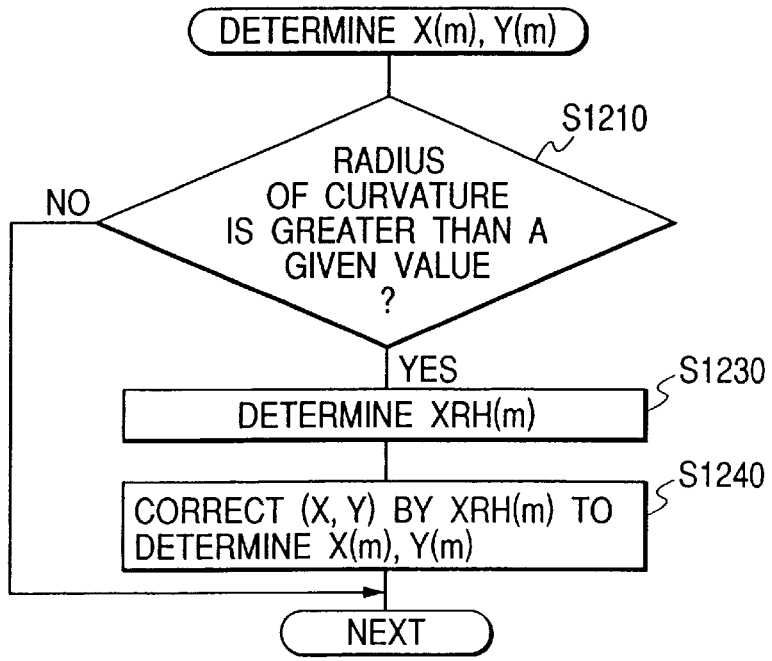
FIG. 5 is a flowchart of a sub-program performed in step 1200 of FIG. 14 to determine a curve-caused error corrected relative position of a moving object.

The determination of the curve-caused error corrected moving object relative position $(X_{(m)}, Y_{(m)})$ in step 1200 will be discussed below in detail with reference to FIG. 5.

After entering step 1200, the routine proceeds to step 1210 wherein it is determined whether the radius of curvature R of a road determined by the radius-of-curvature determining circuit 63 is greater than a given value or not. If a NO answer is obtained meaning that the road is making a sharp turn, then the routine terminates without calculating the curve-caused error corrected moving object relative position $(X_{(m)}, Y_{(m)})$. Alternatively, if a YES answer is obtained meaning that the road is making a gentle turn or straight, then the routine proceeds to step 1230 wherein a curve-caused error correction value $X_{RH(m)}$ is determined according to the equation below.

$$X_{RH(m)}=(L^2/R)\cdot(90°/\pi)$$

where L is the distance to the moving object.

The routine proceeds to step 1240 wherein the apparent relative position (X, Y) of the moving object is corrected using the curve-caused error correction value $X_{RH(m)}$ according to the equation below to determine the curve-caused error corrected 20 moving object relative position $(X_{(m)}, Y_{(m)})$.

$$X_{(m)}=X-X_{RH(m)}$$

$$Y_{(m)}=Y$$

The operations in steps 1230 and 1240 are based on the fact below.

Figure 16:
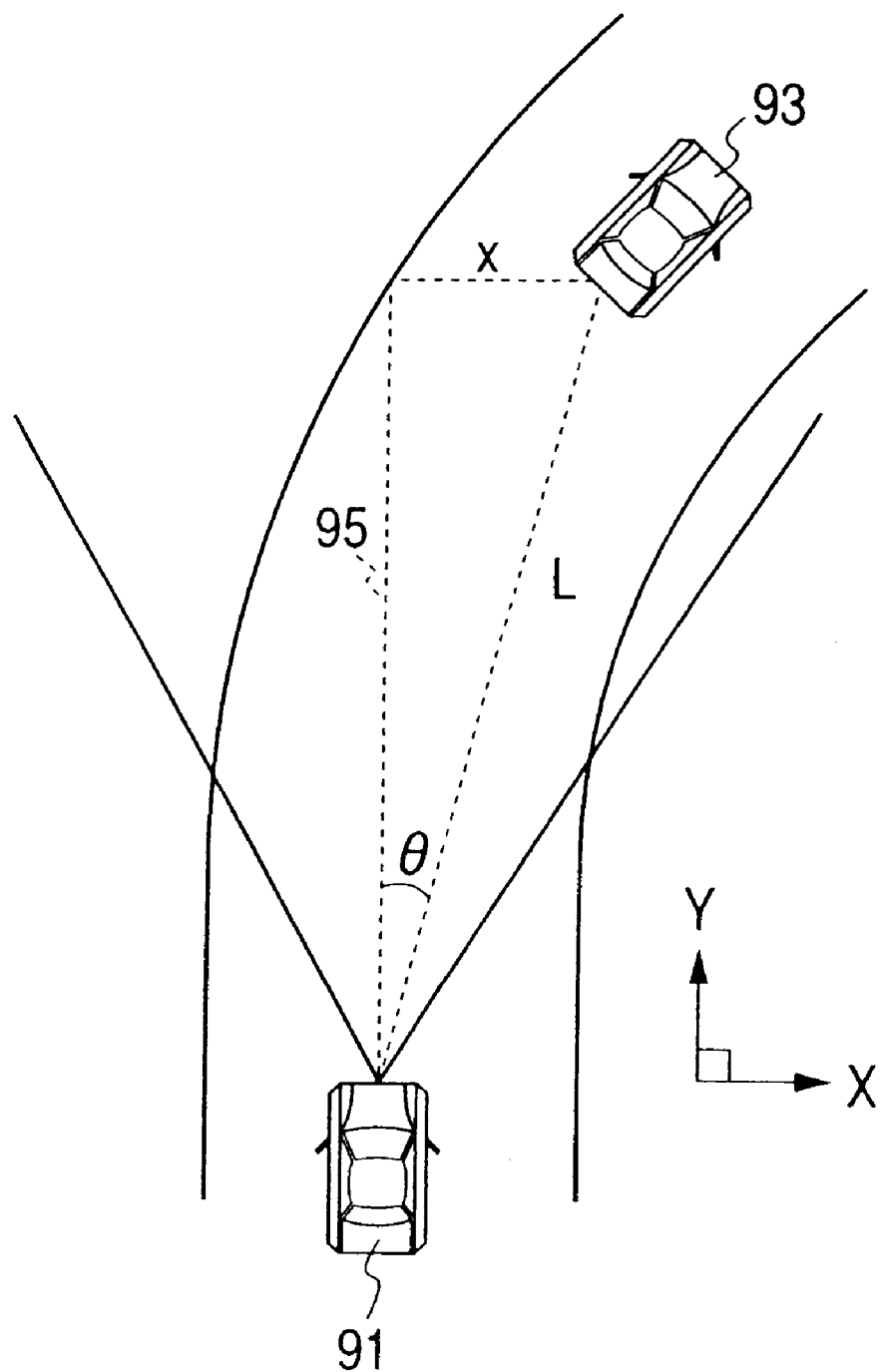
FIG. 16 illustrates an angular error to be produced in determination of an angular shift of the central axis of radar wave radiation when a preceding vehicle is traveling on the same lane as a system vehicle, but on a curved road.

When the preceding vehicle 93 is, as shown in FIG. 16, traveling on the same lane as the system vehicle 91, but on a curved road, it will cause the preceding vehicle 93 to be determined as being located at a position (X, Y) shifted horizontally from the central axis of radar radiation 95 even if the central axis of radar wave radiation 95 aligns with the longitudinal center line of the system vehicle 91. Thus, an x-coordinate of the apparent relative position (X, Y) of the moving object is determined in step 1230 as the curve-caused error correction value $X_{RH(m)}$. The curve-caused error corrected moving object relative position $(X_{(m)}, Y_{(m)})$ is determined in step 1240 by subtracting the curve-caused error correction value $X_{RH(m)}$ from the x-coordinate of the apparent relative position (X, Y).

Figure 6:
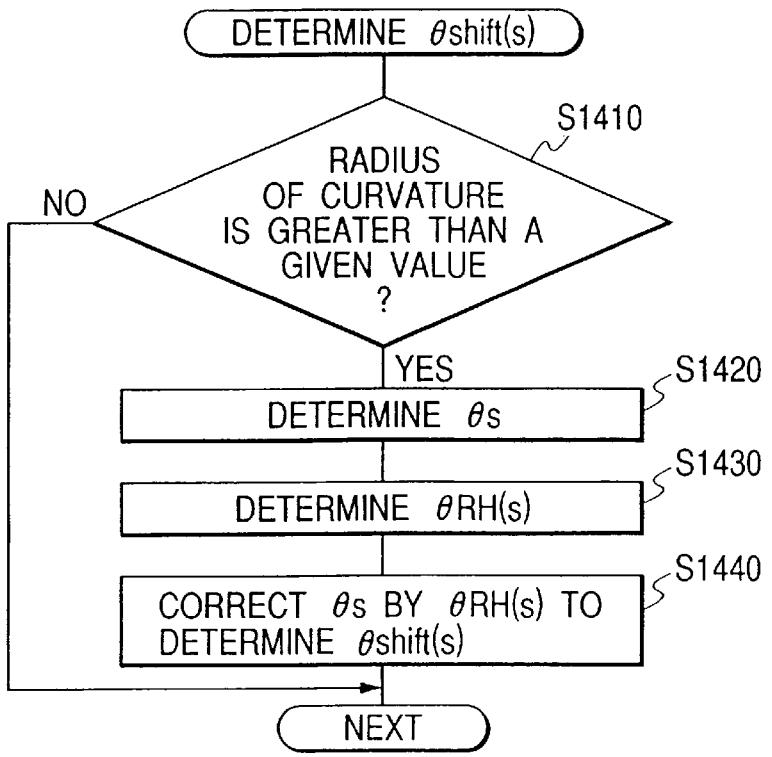
FIG. 6 is a flowchart of a sub-program performed in step 1400 of FIG. 14 to determine a stationary object angular shift correction value.

The determination of the stationary object angular shift correction value $\theta_{shift(s)}$ in step 1400 will be discussed below in detail with reference to FIG. 6.

After entering step 1400, the routine proceeds to step 1410 wherein it is determined whether the radius of curvature R of a road determined by the radius-of-curvature determining circuit 63 is greater than a given value or not. If a NO answer is obtained meaning that the road is making a sharp turn so that a great error will arise in determination of the stationary object angular shift correction value $\theta_{shift(s)}$, then the routine terminates without calculating the stationary object angular shift correction value $\theta_{shift(s)}$. Alternatively, if a YES answer is obtained meaning that the road is making a gentle turn or straight, then the routine proceeds to step 1420 wherein an apparent angular shift θs of central axis of radar wave radiation is determined using relative speed vectors (Vx, Vy) of the stationary object according to the equation below.

$$\theta s=(Vx/Vy)\cdot(180°/\pi)$$

The routine proceeds to step 1430 wherein a curve-caused error correction value $\theta_{RH}(s)$ is determined according to the equation below.

$$\theta_{RH(s)}=(L/R)\cdot(190°/\pi)$$

where L is the distance to the stationary object.

The routine proceeds to step 1440 wherein the apparent angular shift θs derived in step 1420 is corrected using the curve-caused error correction value $\theta_{RH(s)}$ to determine the stationary object angular shift correction value $\theta_{shift(s)}$.

The operations in steps 1430 and 1440 are based on the fact below.

Figure 17:
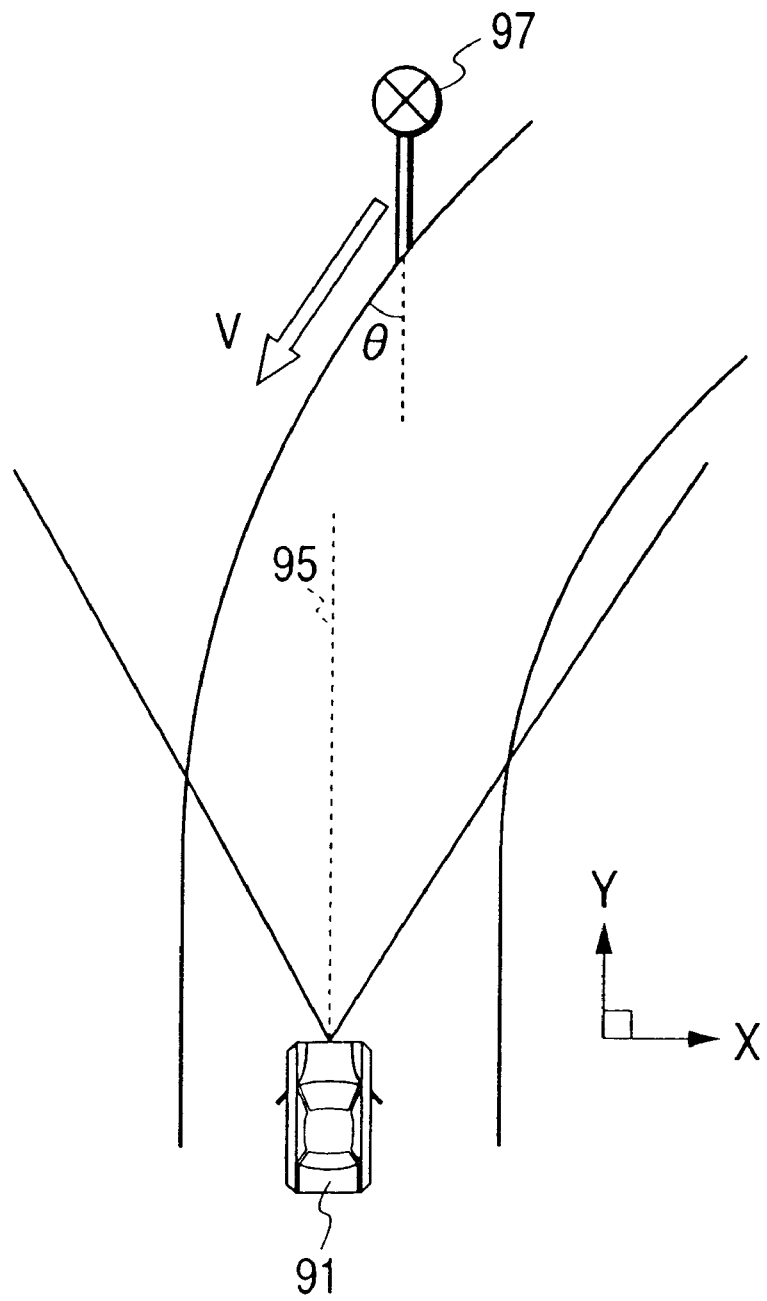
FIG. 17 illustrates a vector of relative speed of a stationary object when a system vehicle is traveling on a curved road.

When the system vehicle is, as shown in FIG. 17, traveling on a curved road, it will cause the direction V of relative speed of the stationary object 97 is not in parallel to the central axis of radar wave radiation 95 even if the central axis of radar wave radiation 95 aligns with the longitudinal center line of the system vehicle 91. This causes an angular error θ to be produced in determination of the stationary object angular shift correction value $\theta_{shift(s)}$. Specifically, an angular shift of the central axis of radar wave radiation 95 that does not exist actually is determined in error. Thus, angular error θ is determined in step 1430 as the curve-caused error correction value $\theta_{RH(s)}$ based on the radius of curvature R of the road and the distance L between the stationary object 97 and the system vehicle 91. The stationary object angular shift correction value $\theta_{shift(s)}$ is determined in step 1440 by subtracting the curve-caused error correction value $\theta_{RH(s)}$ from the apparent angular shift θs.

After completion of the sub-program in FIG. 4, that is, after the angular shift correction value $\theta_{shift}$ is determined in step 1000 of FIG. 3, the routine proceeds to step 2000 to perform operations as discussed below.

The central axis-of-radar wave radiation correcting circuit 61 provides signals indicative of first and second angular shift correction values θsh1 and θsh2 satisfying relations below to the distance/azimuth measuring scanner 5 and the coordinate transformation circuit 41, respectively.

$$\theta_{shift}=\theta sh1+\theta sh2$$

$$\theta sh1=0.5°\times n$$

$$\theta sh2=\theta_{shift}-\theta sh1$$

where n is an absolute value of a maximum integer meeting the relation of $|\theta_{shift}|\geq 0.5°\times|n|$.

Specifically, the first angular shift correction value θsh1 indicates an integral multiple of 0.5° smaller than $\theta_{shift}$, while the second angular shift correction value θsh2 indicates a remainder of subtraction of θsh1 from $\theta_{shift}$.

The distance/azimuth measuring scanner 5 scans the obstacle detectable zone of ±8° across the central axis of radar wave radiation 95 with a resolution of 0.5°. The distance/angle determining circuit 33 receives 33 beam signals reflected from the obstacle detectable zone every scanning operation and stores 33 distance data components in internal memory locations of addresses D[1] to D[33] which indicate angular directions of the beam signals in units of 0.5°, respectively. Therefore, a component of the angular shift of the central axis of radar wave radiation 95 corresponding to the first angular shift correction value θsh1 is eliminated by shifting each of the distance data components to one of the memory locations provided the n addresses away.

Next, the remaining component of the angular shift of the central axis of radar wave radiation 95 corresponding to the second angular shift correction value θsh2 is eliminated by the coordinate transformation circuit 41 in the following manner.

Assuming that the coordinate transformation circuit 41 performs a coordinate transformation operation under the condition that θ[rad] is nearly equal to 0, Y=r, X=r×θ where r is the distance to the target, an x-coordinate X of the central position of the target is corrected according to the following equation.

$$X=r\cdot(\theta-\theta sh2\cdot\pi/180)$$

This allows the central position (X, Y) of the target to be determined accurately in the object identifying circuit 45. Specifically, it becomes possible for the alarm/cruise determining circuit 55 to determine in the alarm mode whether an alarm is to be raised or not or determine in the cruise mode the contents of speed control accurately. When the angular shift correction value $\theta_{shift}$ is greater than a given upper limit, a fail flag is turned on to inform the operator of a sensor malfunction through the sensor malfunction display 17.

The angular shift correction value $\theta_{shift}$ may be multiplied by a gain of 0 to 1 to determine the first and second angular shift correction values θsh1 and θsh2. In this case, the time required for correcting the angular shift of the central axis of radiation is prolonged, but an error component of the angular shift correction value $\theta_{shift}$ is decreased.

The central axis-of-radar wave radiation correcting circuit 61 determines, as described above with reference to FIG. 4, the moving object angular shift correction value $av\theta_{shift(m)}$ and the average value $av\theta_{shift(s)}$ of the stationary object angular shift correction values $\theta_{shift(s)}$. Thus, when a moving object such as the preceding vehicle 93 does not exist in the obstacle detectable zone, the angular shift correction value $\theta_{shift}$ is determined, as shown in step 1900, based on the average value $av\theta_{shift(s)}$ of the stationary object angular shift correction values $\theta_{shift(s)}$. Conversely, when a stationary object such as the roadside obstacle 97 is not detected, for example, because it is hiding behind a preceding vehicle, the angular shift correction value $\theta_{shift}$ is determined based on the moving object angular shift correction values $av\theta_{shift(m)}$. Specifically, it is possible to determine the angular shift correction value $\theta_{shift}$ in most cases to correct the angular shift of central axis of radar wave radiation 95.

The moving object angular shift correction value $av\theta_{shift(m)}$ is determined based on an object which continues to be tracked for five (5) seconds, while the average value $av\theta_{shift(s)}$ of the stationary object angular shift correction values $\theta_{shift(s)}$ is determined based on an object which continues to be tracked for one (1) second, thereby allowing data on an object tracked temporality or data on a vehicle traveling on an adjacent lane to be ignored, thus resulting in accurate correction of the angular shift of central axis of radar wave radiation 95. Particularly, the moving object angular shift correction value $av\theta_{shift(m)}$ is determined based on an object tracked longer, thus improving the accuracy in correction of the angular shift of central axis of radar wave radiation 95 greatly.

The curve-caused error corrected moving object relative position ($X_{(m)}$, $Y_{(m)}$) is determined in step 1230 based the central position of a moving object whose width W meets the relation of 1.2 m<W<2.8 m (see step 1100). This allows data on a two-wheeled vehicle, a vehicle whose reflector on one side has been detected, and vehicles which are traveling parallel to each other and which have been identified as one vehicle to be ignored (there is a high possibility that central position of each vehicle does not lie on the longitudinal center line of the system vehicle), thus resulting in greatly improved accuracy in correction of the angular shift of central as of radar wave radiation 95 greatly.

Figure 7:
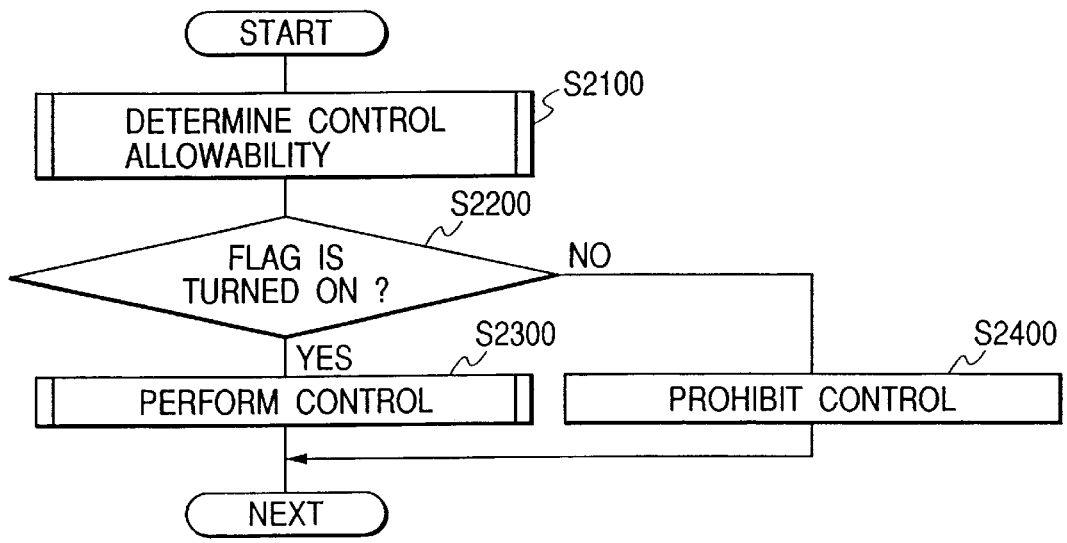
FIG. 7 is a flowchart of a program performed to keep the distance between a preceding vehicle and a system vehicle constant under cruise control.

FIG. 7 shows a program performed by the alarm/cruise determining circuit 55 to keep the distance between a preceding vehicle and the system vehicle constant under the cruise control based on the angular shift correction value $\theta_{shift}$. This program is executed at given time intervals.

Figure 8:
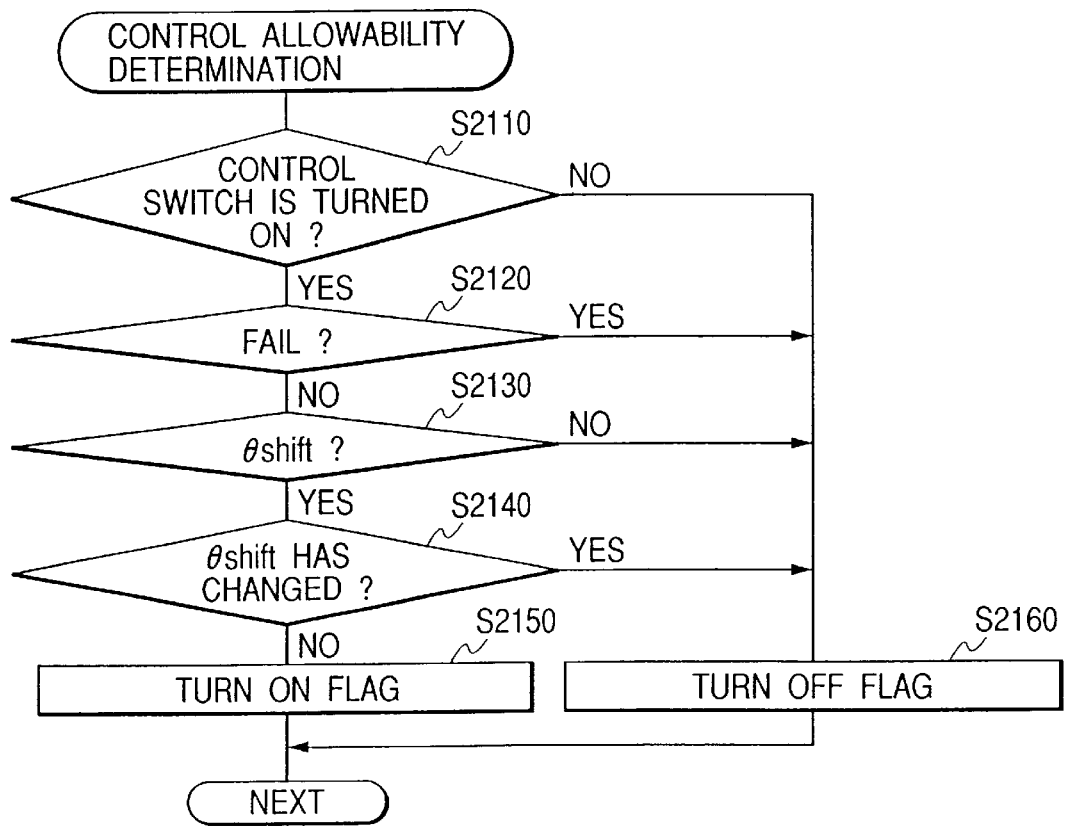
FIG. 8 is a flowchart of a sub-program performed in step 2100 of FIG. 7 to determine whether intervehicle distance control is to be performed or not.

After entering the program, the routine proceeds to stop 2100 wherein it is determined whether the intervehicle distance control is to be performed or not in the manner shown in FIG. 8.

First, in step 2110, it is determined whether a control switch installed in a vehicle cabin is turned on by a vehicle operator or not. If a YES answer is obtained, then the routine proceeds to step 2120 wherein it is determined whether failures of the brake actuator 19 and the throttle actuator 21 are occurring or not. If a NO answer is obtained meaning that the brake actuator 19 and the throttle actuator 21 operate normally, then the routine proceeds to step 2130 wherein it is determined whether the angular shift correction value $\theta_{shift}$ derived in step 1000 of FIG. 3 in a program cycle after the angular shift of central axis of radar wave radiation is corrected is smaller than 1° or not. If a YES answer is obtained, then the routine proceeds to step 2140 wherein it is determined whether a variation in angular shift correction value $\theta_{shift}$ for the past 30 minutes is greater than 1° or not, that is, whether the angular shift correction value $\theta_{shift}$ has changed greatly or not. If a YES answer is obtained, it means that there is a possibility that the transceiver 31 or a portion of a vehicle body near the transceiver 31 is deformed physically due to a collision with any obstacle. Thus, in this case, the routine proceeds to step 2160 wherein a control allowable flag is turned off. Alternatively, if a NO answer is obtained, then the routine proceeds to step 2160 wherein the control allowable flag is turned on.

After step 2100, the routine proceeds to step 2200 wherein it is determined whether the control allowable flat is turned on or off. If a NO answer is obtained, then the routine proceed to step 2400 wherein the intervehicle distance control is prohibited. Alternatively, if a YES answer is obtained then the routine proceeds to step 2300 wherein the intervehicle distance control is performed in the manner as shown in FIG. 9.

First, in step 2310, data on the distance to and angular direction of the target derived after the angular shift of central axis of radar wave radiation is corrected using the angular shift correction value $\theta_{shift}$ is read. The routine proceeds to step 2320 wherein the relative position and relative speed of the target determined in the object identifying circuit 45 based on the distance/azimuth angle data derived in step 2310 are read. The routine proceeds to step 2330 wherein the radius of curvature R of a road on which the system vehicle is traveling calculated by the radius-of-curvature determining circuit 63 is read. The routine proceeds to step 2340 wherein a same lane probability that the target exists in the same traffic lane as the system vehicle is determined using the radius of curvature R and the position (X, Y) of the target on the X-Y plane derived in the object identifying circuit 45. When a plurality of obstacles are detected by the distance/azimuth measuring scanner 5, the same lane probability of each obstacle is determined. The routine proceeds to step 2350 wherein from among the obstacles having the same lane probabilities of more than a preselected value, a target preceding vehicle(s) is selected. The determination of the same lane probability and selection of the target preceding vehicle may be made in a manner as taught in U.S. Pat. No. 5,710,565 (corresponding to German Patent Application laid open on Oct. 10, 1996 under DE196 14 061 A1), issued on Jan. 20, 1998, assigned to the same assignee as that of this application, disclosure of which is incorporated herein by reference.

The routine proceeds to step 2360 wherein a target intervehicle distance is determined based on a manual input by the vehicle operator. The routine proceeds to step 2370 wherein a target acceleration/deceleration of the system vehicle is determined. The routine proceeds to step 2380 wherein a target speed of the system vehicle is determined based on the target acceleration/deceleration determined in step 2370 and a target speed determined in one program cycle earlier. The routine proceeds to step 2390 wherein control signals are outputted to the brake actuator 19 and the throttle actuator 21 to control the speed of the system vehicle to bring the distance to the target into agreement with the target intervehicle distance determined in step 2360.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, it is determined in step 1000 of FIG. 4 whether an object exists in the obstacle detectable zone or not which meets the two conditions that (a) it continues to be tracked for five (5) seconds or more and that (b) the width thereof is greater than 1.2 m and smaller than 2.8 m, but another condition may further be added that a y-coordinate of relative position of the target is greater than a given value. This is because when a moving object is too close to the system vehicle, it will cause the error component of the moving object angular shift correction value $av\theta_{shift(m)}$ due to the offset traveling to further contain a great error.

The angular shift of central axis of radar wave radiation may alternatively be corrected by moving the transceiver 31 itself through an angle corresponding to the angular shift correction value $\theta_{shift}$ using a mechanism such as one taught in Japanese Patent First Publication No. 5-157843, disclosure of which is incorporated herein by reference, or by moving the transceiver 31 manually when the system vehicle has regular maintenance.

In step 2370, the target acceleration/deceleration may be changed, for example, decreased according to the angular shift of central axis of radar wave radiation. In step 2360, the target intervehicle distance may be increased according to the angular shift of central axis of radar wave radiation.

Further, in steps 1210, 1410, the degree of a curve in the road is determined based on the radius of curvature R of the road determined by the radius-of-curvature determining circuit 63, however, it may alternatively be determined based on a relative locus of a radar-tracked stationary object with respect to the system vehicle.

What is claimed is:

1. An angular shift determining apparatus for determining an angular shift of a central axis of radar wave radiation from a radar device used in an automotive obstacle detection system designed to determine a distance to and angular direction of a target tracked by the radar device comprising:

an object identifying circuit that determines a relative position and a relative speed of the target with respect to a system vehicle equipped with the automotive obstacle detection system in cycles based on the distance to and the angular direction of the target determined by the automotive obstacle detection system and that determines whether the target is a moving object or a stationary object based on the relative speed of the target; and an angular shift determining circuit that determines the angular shift of the central axis of radar wave radiation from a longitudinal center line of the system vehicle based on an angular component of the relative position of the moving object as represented by polar coordinates, said angular shift determining circuit also determining an offset of a distribution of relative positions of the moving object, determined by said object identifying circuit in cycles for a preselected period of time when the system vehicle is substantially traveling straight, from the central axis of radar wave radiation in a width-wise direction of the system vehicle to determine an error component of the angular shift of the central axis of radar wave radiation caused by a lateral offset of the moving object from the longitudinal center line of the system vehicle to correct the angular shift of central axis of radar waver radiation by removing the error component therefrom.

2. An angular shift determining apparatus as set forth in claim 1, wherein said angular shift determining circuit determines an inclination of the distribution of the relative positions of the moving object to the central axis of radar waver radiation to define the inclination as the angular shift of the central axis of radar wave radiation.

3. An angular shift determining apparatus as set forth in claim 2, wherein said angular shift determining circuit represents the distribution of the relative positions of the moving object with an approximate line to define an angle between the approximate line and the central axis of radar wave radiation as the angular shift of the central axis of radar wave radiation from the longitudinal center line of the system vehicle.

4. An angular shift determining apparatus as set forth in claim 3, wherein said angular shift determining circuit defines the approximate line using the method of least squares.

5. An angular shift determining apparatus as set forth in claim 2, wherein said angular shift determining circuit sections the distribution of the relative positions of the moving object into at least two areas based on components of the relative positions of the moving object in a direction of the longitudinal center line of the system vehicle to determine major points of the at least two areas, respectively, said angular shift determining circuit determining the inclination of the distribution of the relative positions of the moving object based on the major points.

6. An angular shift determining apparatus as set forth in claim 5, wherein said angular shift determining circuit defines an average of the relative positions of the moving object within each of the areas as the major point thereof.

7. An angular shift determining apparatus as set forth in claim 2, wherein said angular shift determining circuit sections the distribution of the relative positions of the moving object into a first and a second area, the first area being defined by the whole of the distribution, the second area being defined by one of a portion of the distribution where components of the relative positions of the moving object in a direction of the longitudinal center line of the system vehicle are closer to the system vehicle than an average of the relative positions of the moving object within the whole of the distribution and a portion of the distribution where components of the relative positions of the moving object in the direction of the longitudinal center line of the system vehicle are farther from the system vehicle than the average of the relative positions of the moving object within the whole of the distribution, said angular shift determining circuit determining major points of the first and second areas to determine the inclination of the distribution to the central axis of radar waver radiation based on the major points.

8. An angular shift determining apparatus as set forth in claim 2, wherein said angular shift determining circuit sections the distribution of the relative positions of the moving object into a first and a second area, the first area being defined by a portion of the distribution where components of the relative positions of the moving object in a direction of the longitudinal center line of the system vehicle are closer to the system vehicle than an average of the relative positions of the moving object within the whole of the distribution, the second area being defined by a portion of the distribution where components of the relative positions of the moving object in the direction of the longitudinal center line of the system vehicle are farther from the system vehicle than the average of the relative positions of the moving object within the whole of the distribution, said angular shift determining circuit determining major points of the first and second areas to determine the inclination of the distribution to the central axis of radar waver radiation based on the major points.

9. An angular shift determining apparatus as set forth in claim 1, wherein the angular shift determining circuit determines the angular shift of the central axis of radar wave radiation only when the moving object is located away from the system vehicle by a distance which is greater than a given value.

10. An angular shift determining apparatus as set forth in claim 1, wherein said angular shift determining circuit determines whether the system vehicle is traveling on a curved road or not, when it is determined that the system vehicle is traveling on the curved road, said angular shift determining circuit determining a radius of curvature of the curved road to determine a second error component of the angular shift of the central axis of radar wave radiation caused by the traveling of the system vehicle on the curved road to correct the angular shift of central axis of radar waver radiation by removing the second error component therefrom.

11. An angular shift determining apparatus as set forth in claim 10, wherein said angular shift determining circuit determines whether the system vehicle is traveling on the curved road or not based on a steered angle of the system vehicle.

12. An angular shift determining apparatus for determining an angular shift of a central axis of radar wave radiation from a radar device used in an automotive obstacle detection system designed to determine a distance to and angular direction of a target tracked by the radar device comprising:

an object identifying circuit that determines a relative position and a relative speed of the target to a system vehicle equipped with the automotive obstacle detection system in cycles based on the distance to and the angular direction of the target determined by the automotive obstacle detection system and that determines whether the target is a moving object or a stationary object based on the relative speed of the target; and an angular shift determining circuit that determines the angular shift of the central axis of radar wave radiation from a longitudinal center line of the system vehicle based on a direction of the relative speed of the target determined as the stationary object, when the system vehicle is traveling on a curve in a road, said angular shift determining circuit also determining the degree of the curve to determine an error component of the angular shift of the central axis of radar wave radiation caused by the traveling of the system vehicle on the curve to correct the angular shift of central axis of radar waver radiation by removing the error component therefrom.

13. An angular shift determining apparatus for determining an angular shift of a central axis of radar wave radiation from a radar device used in an automotive obstacle detection system designed to determine a distance to and angular direction of a target tracked by the radar device comprising:

an object identifying circuit that determines a relative position and a relative speed of each target traced by the radar device to a system vehicle equipped with the automotive obstacle detection system in cycles based on the distance to and the angular direction of the target determined by the automotive obstacle detection system and that determines whether the target is a moving object or a stationary object based on the relative speed of the target; and an angular shift determining circuit that determines an angular shift of the central axis of radar wave radiation from a longitudinal center line of the system vehicle as a first angular shift based on the relative position of the target determined as the moving object, said angular shift determining circuit also determining an offset of a distribution of relative positions of the moving object, determined by said object identifying circuit in cycles for a preselected period of time when the system vehicle is substantially traveling straight, from the central axis of radar wave radiation in a width-wise direction of the system vehicle to determine a first error component included in the first angular shift caused by a lateral offset of the moving object from the longitudinal center line of the system vehicle to remove the first error component from the first angular shift to determine a first error-removed angular shift, said angular shift determining circuit determining an angular shift of the central axis of radar wave radiation as a second angular shift based on a direction of the relative speed of the target determined as the stationary object, when the system vehicle is traveling on a curve in a road, said angular shift determining circuit also determining the degree of the curve to remove an error component caused by the traveling of the system vehicle on the curve from the second angular shift to determine a second error-removed angular shift, said angular shift determining circuit mathematically projecting an actual angular shift of the central axis of radar wave radiation based on the first and second error-removed angular shifts.

14. An angular shift determining apparatus as set forth in claim 13, wherein said angular shift determining circuit determines whether the system vehicle is traveling on the curved road or not based on a steered angle of the system vehicle.

15. An angular shift determining apparatus as set forth in claim 13, wherein said angular shift determining circuit determines whether the system vehicle is traveling on the curved road or not based on a relative locus of the target determined as the stationary object with respect to the system vehicle.

16. An angular shift determining apparatus as set forth in claim 13, further comprising an angular direction correcting circuit that corrects the angular direction of the target determined by the automotive obstacle detection system based on the actual angular shift of the central axis of radar wave radiation mathematically projected by said angular shift determining circuit.

17. An angular shift determining apparatus as set forth in claim 16, wherein said angular shift determining circuit determines the first and second error-removed angular shifts in cycles for a preselected period of time to determine a first and a second average angular shift, said angular shift determining circuit mathematically projecting the actual angular shift of the central axis of radar wave radiation based on the first and second average angular shifts.

18. An angular shift determining apparatus as set forth in claim 16, wherein said angular shift determining circuit mathematically projects the actual angular shift of the central axis of radar wave radiation based a value derived by a weighted averaging operation on the first and second error-removed angular shifts.

19. An automotive obstacle detection apparatus comprising:

a radar device that transmits a radar wave over a given detection range across a central axis at given angular intervals;

a distance determining circuit that determines a distance to a target within the given detection range based on a time interval between transmission of the radar wave and reception of the radar wave reflected from the given detection range;

a storage device that stores a relation between the distance to the target determined by said distance determining circuit and an angular direction of the radar wave transmitted by said radar wave;

an object identifying circuit that determines a relative position and a relative speed of the target to a subject vehicle equipped with the obstacle detection apparatus in cycles based on the distance to and the angular direction of the target stored in said storage device and that determines whether the target is a moving object or a stationary object based on the relative speed of the target;

an angular shift determining circuit that determines an angular shift of the central axis of radar wave radiation from a longitudinal center line of the subject vehicle based on the relative position of the moving object, said angular shift determining circuit also determining an offset of a distribution of relative positions of the moving object, determined by said object identifying circuit in cycles for a preselected period of time when the subject vehicle is substantially traveling straight, from the central axis of radar wave radiation in a width-wise direction of the subject vehicle to determine an error component of the angular shift of the central axis of radar wave radiation caused by a lateral offset of the moving object from the longitudinal center line of the system vehicle to mathematically project an actual angular shift of central axis of radar waver radiation by removing the error component therefrom; and an angular direction correcting circuit that corrects the angular direction of the target by modifying the relation between the distance to the target and the angular direction of the radar wave transmitted by said radar wave stored in said storage device so as to eliminate the actual angular shift of the central axis of radar waver radiation.

20. An automotive obstacle detection apparatus as set forth in claim 19, further comprising a coordinate transformation circuit that subjects the distance to and the angular direction of the target to a given operation to determine a position of the target on a rectangular coordinate plane, and wherein said angular direction correcting circuit modifies the given operation of said coordinate transformation circuit so as to eliminate the actual angular shift of the central axis of radar waver radiation to correct the angular direction of the target.

21. An automotive obstacle detection apparatus as set forth in claim 19, wherein said angular shift determining circuit determines an angular shift of the central axis of radar wave radiation from the longitudinal center line of the system vehicle as a first angular shift based on the relative position of the target determined as the moving object to remove the error component caused by the lateral offset of the moving object from the longitudinal center line of the system vehicle from the first angular shift to determine a first error-removed angular shift, said angular shift determining circuit determining an angular shift of the central axis of radar wave radiation as a second angular shift based on a direction of the relative speed of the target determined as the stationary object, when the system vehicle is traveling on a curve in a road, said angular shift determining circuit also determining the degree of the curve to remove an error component caused by the traveling of the system vehicle on the curve from the second angular shift to determine a second error-removed angular shift, said angular shift determining circuit determining the actual angular shift based on the first and second error-removed angular shifts.

22. An automotive intervehicle distance control apparatus comprising:

an automotive obstacle detection apparatus including
(a) a radar device that transmits a radar wave over a given detection range across a central axis at given angular intervals,
(b) a distance/angle determining circuit that determines a distance to and an angular direction of a target within the given detection range based on a signal derived by reflection of the radar wave from the given detection range, and
(c) an object identifying circuit that determines a relative position and a relative speed of the target to a vehicle controlled by the automotive intervehicle distance control apparatus in cycles based on the distance to and the angular direction of the target and that determines whether the target is a moving object or a stationary object based on the relative speed of the target;

an angular shift determining circuit that determines an angular shift of the central axis of radar wave radiation from a longitudinal center line of the controlled vehicle based the relative position of the moving object, said angular shift determining circuit also determining an offset of a distribution of relative positions of the moving object determined by said object identifying circuit in cycles for a preselected period of time from the central axis of radar wave radiation in a width-wise direction of the controlled vehicle to determine an error component of the angular shift of the central axis of radar wave radiation caused by a lateral offset of the moving object from the longitudinal center line of the system vehicle to mathematically project an actual angular shift of central axis of radar waver radiation by removing the error component from said angular shift of the central axis of radar wave radiation;

a correcting circuit that corrects the distance to and the angular direction of the target so as to eliminate the actual angular shift of the central axis of radar wave radiation; and an intervehicle distance control circuit that determines whether the target tracked by said radar device is a preceding vehicle traveling ahead of the controlled vehicle or not based on the distance to and the angular direction of the target corrected by said correcting circuit when an intervehicle distance control mode is entered, when it is determined that the target is the preceding vehicle, said intervehicle distance control circuit controlling speed of the controlled vehicle at a target change rate to bring a distance between the preceding vehicle and the controlled vehicle into agreement with a target distance.

23. An automotive intervehicle distance control apparatus as set forth in claim 22, wherein said angular shift determining circuit determines an angular shift of the central axis of radar wave radiation from the longitudinal center line of the system vehicle as a first angular shift based on the relative position of the target determined as the moving object to remove the error component caused by the lateral offset of the moving object from the longitudinal center line of the system vehicle from the first angular shift to determine a first error-removed angular shift, said angular shift determining circuit determining an angular shift of the central axis of radar wave radiation as a second angular shift based on a direction of the relative speed of the target determined as the stationary object, when the system vehicle is traveling on a curve in a road, said angular shift determining circuit also determining the degree of the curve to remove an error component caused by the traveling of the system vehicle on the curve from the second angular shift to determine a second error-removed angular shift, said angular shift determining circuit determining the actual angular shift based on the first and second error-removed angular shifts.

24. An automotive intervehicle distance control apparatus as set forth in claim 22, wherein said intervehicle distance control circuit changes the target change rate of the speed of the controlled vehicle according to the actual angular shift of the central axis of radar wave radiation.

25. An automotive intervehicle distance control apparatus as set forth in claim 24, wherein said intervehicle distance control circuit decreases the target change rate based on the actual angular shift of the central axis of radar wave radiation.

26. An automotive intervehicle distance control apparatus as set forth in claim 22, wherein said intervehicle distance control circuit prohibits the controlled vehicle from entering the intervehicle distance control mode when the actual angular shift of the central axis of radar wave radiation shows a given abnormal value.

27. An automotive intervehicle distance control apparatus as set forth in claim 22, wherein said intervehicle distance control circuit prohibits the controlled vehicle from entering the intervehicle distance control mode when the actual angular shift of the central axis of radar wave radiation has a change greater than a given value within a given period of time.

* * * * *